United States Patent
Agarwal et al.

(10) Patent No.: US 12,082,101 B2
(45) Date of Patent: *Sep. 3, 2024

(54) SERVICE RELATIONSHIP IN A WIRELESS COMMUNICATION SYSTEM

(71) Applicant: QUALCOMM Incorporated, San Diego, CA (US)

(72) Inventors: Ravi Agarwal, San Diego, CA (US); Gavin Bernard Horn, La Jolla, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,241

(22) Filed: Dec. 8, 2022

(65) Prior Publication Data
US 2023/0096036 A1 Mar. 30, 2023

Related U.S. Application Data

(63) Continuation of application No. 17/364,867, filed on Jun. 30, 2021, now Pat. No. 11,564,160.
(Continued)

(51) Int. Cl.
*H04W 48/18* (2009.01)
*H04B 17/318* (2015.01)
(Continued)

(52) U.S. Cl.
CPC .......... *H04W 48/18* (2013.01); *H04B 17/318* (2015.01); *H04W 48/10* (2013.01); *H04W 48/16* (2013.01)

(58) Field of Classification Search
CPC ..... H04W 48/10; H04W 48/18; H04W 48/16; H04B 17/318
See application file for complete search history.

(56) References Cited

U.S. PATENT DOCUMENTS 10,849,022 B2 11/2020 Park et al.
10,959,171 B2 3/2021 Paredes Cabrera et al.
(Continued)

FOREIGN PATENT DOCUMENTS

WO WO0126409 A1 4/2001
WO WO2012139639 A2 10/2012
(Continued)

OTHER PUBLICATIONS

International Search Report and Written Opinion—PCT/US2021/040091—ISA/EPO—2021-11-0.

*Primary Examiner* — Diane D Mizrahi
(74) *Attorney, Agent, or Firm* — Holland & Hart LLP

(57) ABSTRACT

This disclosure provides systems, methods, and apparatus, including computer programs encoded on computer-readable media, for a service-based cell reselection by a user equipment (UE) in a wireless communication system. The UE may have a service relationship with a particular service. A wireless communication system may provide different types of services via different radio frequencies. The UE may determine which cells to measure for cell reselection to include those that correspond to a service of interest to the UE. In addition to power savings, the UE may experience faster cell reselection for a service. The techniques of this disclosure also may enable a priority-based cell reselection so that the UE can camp on a cell that supports a higher priority service compared to other services supported by the UE.

30 Claims, 12 Drawing Sheets

Related U.S. Application Data

(60) Provisional application No. 63/050,074, filed on Jul. 9, 2020.

(51) Int. Cl.
*H04W 48/10* (2009.01)
*H04W 48/16* (2009.01)

(56) References Cited

U.S. PATENT DOCUMENTS

| | | |
|---|---|---|
| 2017/0064691 A1 | 3/2017 | Kubota et al. |
| 2018/0115652 A1 | 4/2018 | Russell et al. |
| 2019/0132740 A1 | 5/2019 | De et al. |
| 2021/0195405 A1 | 6/2021 | Gurumoorthy et al. |
| 2022/0015025 A1* | 1/2022 | Agarwal ............... H04W 48/10 |

FOREIGN PATENT DOCUMENTS

| | | |
|---|---|---|
| WO | WO2016116145 A1 | 7/2016 |
| WO | WO-2020022762 A1 | 1/2020 |

* cited by examiner

500

510 — RECEIVE FREQUENCY INFORMATION INDICATING AVAILABLE FREQUENCIES OF ONE OR MORE CELLS OF AT LEAST A FIRST BASE STATION OF A WIRELESS COMMUNICATION NETWORK

520 — RECEIVE A SERVICE MAPPING THAT INDICATES WHICH AVAILABLE FREQUENCIES CORRESPOND TO WHICH AVAILABLE SERVICES OF THE WIRELESS COMMUNICATION NETWORK, WHEREIN THE UE HAS A SERVICE RELATIONSHIP WITH ONE OR MORE SERVICES OF THE AVAILABLE SERVICES

530 — MEASURE SIGNAL QUALITY OR SIGNAL STRENGTH OF ONE OR MORE FREQUENCIES OF THE AVAILABLE FREQUENCIES BASED ON THE SERVICE MAPPING, THE ONE OR MORE FREQUENCIES INCLUDING THOSE THAT CORRESPOND TO THE ONE OR MORE THE SERVICES WITH WHICH THE UE HAS THE SERVICE RELATIONSHIP

*FIGURE 5*

EXAMPLE SERVICE FREQUENCY MAPPING

| RAT | FREQUENCIES/ CELLS | SERVICES |
|---|---|---|
| RAT 1 | FREQ 1 | SERVICE 1 |
| | | SERVICE 2 |
| | FREQ 2 | SERVICE 1 |
| | | SERVICE 3 |
| | FREQ 3 | SERVICE 1 |
| | FREQ 4 | SERVICE 4 |
| | | SERVICE 5 |
| RAT 2 | FREQ 5 | SERVICE 2 |
| | | SERVICE 3 |
| | FREQ 6 | SERVICE 1 |
| | | SERVICE 5 |
| | FREQ 7 | SERVICE 2 |
| RAT 3 | FREQ 8 | SERVICE 1 |
| | | SERVICE 4 |
| | FREQ 9 | SERVICE 2 |
| | | SERVICE 3 |

*FIGURE 7A*

EXAMPLE FREQUENCIES TO MEASURE FOR "SERVICE 5"

| RAT | FREQUENCIES/ CELLS | SERVICES |
|---|---|---|
| RAT 1 | FREQ 1 | SERVICE 1 |
| | | SERVICE 2 |
| | FREQ 2 | SERVICE 1 |
| | | SERVICE 3 |
| | FREQ 3 | SERVICE 1 |
| | FREQ 4 | SERVICE 4 |
| | | SERVICE 5 |
| RAT 2 | FREQ 5 | SERVICE 2 |
| | | SERVICE 3 |
| | FREQ 6 | SERVICE 1 |
| | | SERVICE 5 |
| | FREQ 7 | SERVICE 2 |
| RAT 3 | FREQ 8 | SERVICE 1 |
| | | SERVICE 4 |
| | FREQ 9 | SERVICE 2 |
| | | SERVICE 3 |

*FIGURE 7B*

SERVICE RELATIONSHIP IN A WIRELESS COMMUNICATION SYSTEM

CROSS-REFERENCE TO RELATED APPLICATIONS

The present application for patent is a Continuation of U.S. patent application Ser. No. 17/364,867 by AGARWAL et al., entitled "SERVICE RELATIONSHIP IN A WIRELESS COMMUNICATION SYSTEM" filed Jun. 30, 2021, which claims priority to U.S. Provisional Patent Application No. 63/050,074 by AGARWAL et al., entitled "CELL RESELECTION MEASUREMENTS BASED ON SERVICE RELATIONSHIP IN A WIRELESS COMMUNICATION SYSTEM," filed Jul. 9, 2020, each of which is assigned to the assignee hereof, and each of which are expressly incorporated by reference in their entirety herein.

TECHNICAL FIELD

Aspects of the present disclosure relate generally to wireless communications and a user equipment (UE) service relationship in a wireless communication system.

DESCRIPTION OF THE RELATED TECHNOLOGY

Wireless communication systems are widely deployed to provide various types of communication content such as voice, video, packet data, messaging, broadcast, and so on. These systems may be capable of supporting communication with multiple users by sharing the available system resources (for example, time, frequency, and power). A wireless communication system may include one or more base stations or one or more network access nodes, each simultaneously supporting communication for multiple communication devices, which may be otherwise known as user equipment (UE). Different base stations or network access nodes may implement different radio communication protocols, including fourth-generation (4G) systems such as Long Term Evolution (LTE) systems, LTE-Advanced (LTE-A) systems, or LTE-A Pro systems, and fifth-generation (5G) systems which may be referred to as New Radio (NR) systems. NR, which also may be referred to as 5G for brevity, is a set of enhancements to the LTE mobile standard promulgated by the Third Generation Partnership Project (3GPP).

A wireless communication system may support different services. Example services may include voice service, packet data service, enhanced mobile broadband (eMBB), Internet of things (IOT) service, ultra-reliable low latency communication (URLLC), and massive machine type communication (MMTC), among other examples. A UE may be configured to utilize one or more services supported by the wireless communication system.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication by an apparatus of a user equipment (UE). The method may include receive frequency information indicating available frequencies of one or more cells of at least a first base station of a wireless communication network. The method may include receive a service mapping that indicates which available frequencies correspond to which available services of the wireless communication network. The UE may have a service relationship with one or more services of the available services. The method may include measuring signal quality or signal strength of one or more frequencies of the available frequencies based on the service mapping. The one or more frequencies may include those that correspond to the one or more the services with which the UE has the service relationship.

In some implementations, the one or more frequencies include a subset of the available frequencies. In some implementations, the method may include refraining from measuring signal quality or signal strength of one or more other frequencies that correspond to other services with which the UE does not have a service relationship.

Another innovative aspect of the subject matter described in this disclosure can be implemented in a UE. The UE may include at least one modem configured to obtain frequency information indicating available frequencies of one or more cells of at least a first base station of a wireless communication network. The at least one modem may be configured to obtain a service mapping that indicates which available frequencies correspond to which available services of the wireless communication network. The UE may have a service relationship with one or more services of the available services. The UE may include a processing system configured to measure signal quality or signal strength of one or more frequencies of the available frequencies based on the service mapping. The one or more frequencies may include those that correspond to the one or more the services with which the UE has the service relationship.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 5 shows a flowchart illustrating a first example process for measuring signal quality or signal strength of frequencies based on a service relationship.

FIG. 7A shows an example service mapping.

FIG. 7B shows an example selection of frequencies based on the service mapping of FIG. 7A.

Like reference numbers and designations in the various drawings indicate like elements.

DETAILED DESCRIPTION

Figure 1:
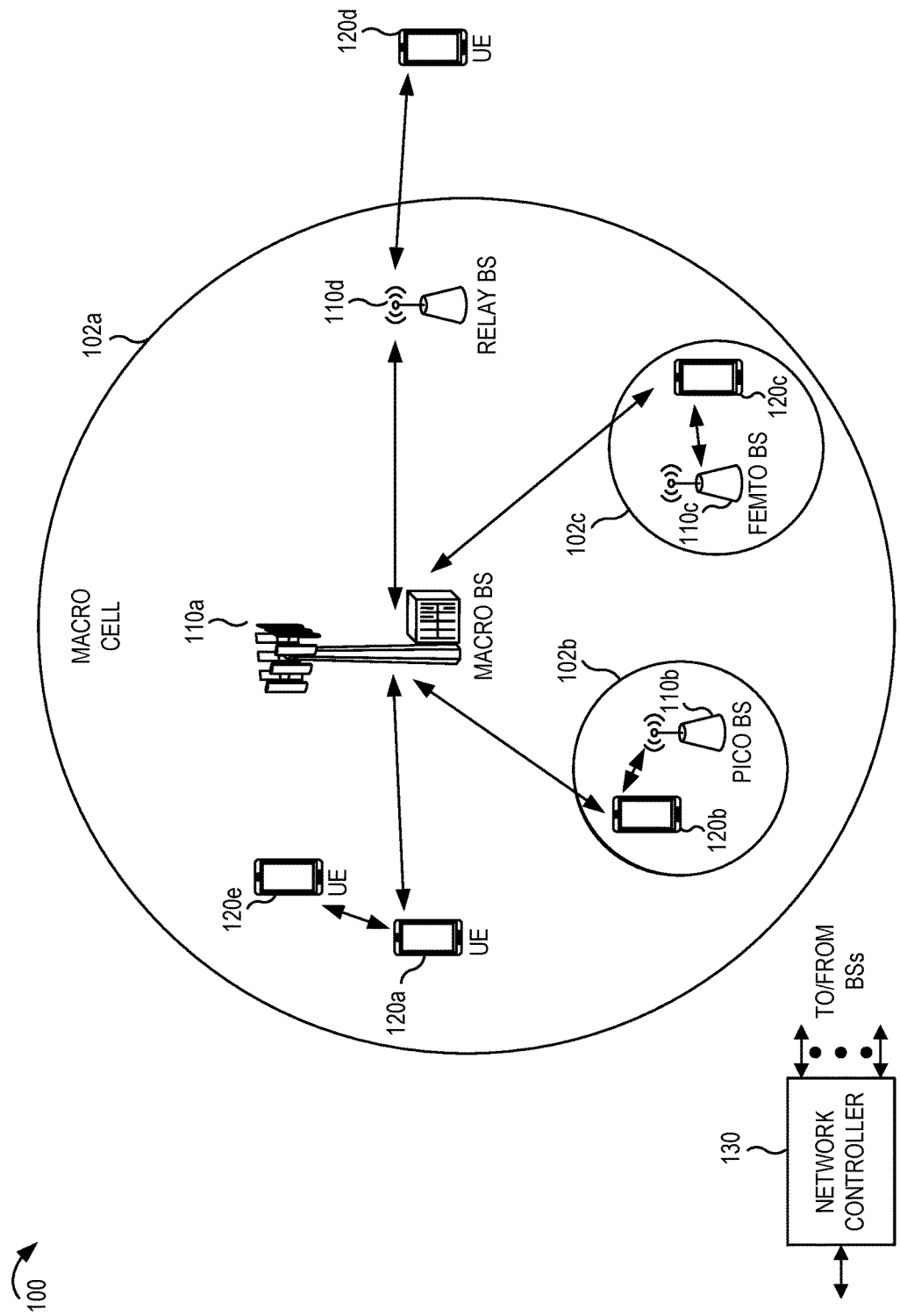
FIG. 1 shows a pictorial diagram conceptually illustrating an example of a wireless communication system.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A wireless communication system (which also may be referred to as a wireless communication network) may include one or more radio access networks (RANs) that provide access for a user equipment (UE) to communicate with other nodes in the wireless communication system. A radio access network (RAN, sometimes also referred to as a radio network or access network) may include a number of base stations (BSs) that can support communication for a number of user equipment (UEs). Different types of base stations may be referred to as a NodeB, an LTE evolved NodeB (eNB), a next generation NodeB (gNB), an access point (AP), a radio head, a transmit-receive point (TRP), among other examples, depending on the wireless communication standard that the base station supports. One or more LTE base stations may make up an LTE radio access network (RAN). The LTE RAN (sometimes also referred to as an LTE network) provides access to the wireless communication system. Similarly, one or more 5G base stations may make up a 5G New Radio (NR) RAN, and may be referred to as a 5G NR network that provides access to the wireless communication system. The LTE network and 5G NR network may be two examples of a radio access network that can be used to communicate to a core network of the wireless communication system. A cell may refer to a geographic or logical portion of a coverage area of a base station. Within each cell, the base station may operate different frequencies for radio frequency communication between the UE and the base station.

Various services supported by a wireless communication system may be enabled via different frequencies of the radio access network. For example, one or more frequencies in a first cell of a base station may provide access to a first service, and one or more frequencies in a second cell of that base station or another base station may provide access to a second service. Example services may include voice service, packet data service, enhanced mobile broadband (eMBB), Internet of things (IOT) service, ultra-reliable low-latency communication (URLLC), and massive machine type communication (MMTC), among other examples. A UE may be configured to utilize one or more services supported by the wireless communication system. For example, the UE may have a service relationship with one or more services. Conversely, there may be services supported by the wireless communication network with which the UE may not have a service relationship. Thus, the UE may have an interest in some services supported by the wireless communication system and may not have interest in some other services supported by the wireless communication system.

This disclosure provides systems, methods, and apparatus, including computer programs encoded on computer-readable media, for cell reselection based on service interest. Various implementations relate generally to determining which frequencies of neighbor cells to measure for possible cell selection or reselection while the UE is an idle or inactive state. Traditional cell selection or reselection may involve selection of a cell that has a highest signal strength or signal quality from among the cells that the UE can measure. The UE may monitor signal strength and signal quality of multiple frequencies to select a cell of the radio access network. In accordance with some implementations described herein, the UE may determine which frequencies to monitor based on one or more services that the UE is likely to utilize. Furthermore, the cell reselection can be made based on a service prioritization and a frequency prioritization. Using the techniques of this disclosure, the UE can more efficiently monitor frequencies for those services with which the UE has a service relationship and perform a cell reselection to a cell that is suitable for the UE to access those services.

A UE may receive frequency information via a broadcast message or dedicated messaging from a first cell to learn about available frequencies in use by nearby cells. For example, frequency information may be included in a system information (SI) message or may be included in another type of message that can be populated with the frequency information. The frequency information enables the UE to discover potential frequencies for nearby cells. The UE may initially camp on a first cell to register with the wireless communication system. For example, the UE may perform a tracking area registration, so the wireless communication system knows which tracking area to page the UE for mobile-terminated communications. Additionally, the UE may establish a radio resource control (RRC) relationship with the first cell to obtain further frequency information, service mapping, frequency prioritization, or other information about the wireless communication system. A UE is said to be camped on a cell when the UE has registered with the wireless communication and established a basic RRC relationship with the cell so that the cell is available for mobile originated (MO) or mobile terminated (MT) communication between the UE and the cell.

There are different RRC states that a UE may have depending on its connection with a base station. For example, the UE may be in an RRC connected (RRC_CONNECTED) state, an RRC idle (RRC_IDLE) state, or an RRC inactive (RRC_INACTIVE) state. In the RRC_CONNECTED state, the UE may have an active radio connection with the base station and the base station may control mobility of the UE by managing handovers of the UE between neighboring cells. In the RRC_IDLE and RRC_INACTIVE states, the UE may manage its mobility and can perform a cell reselection to camp on a different cell when the UE determines that a neighbor cell would be more suitable. The RRC_IDLE state refers to a state in which the UE may monitor for paging messages or short messages but does not have an access stratum (AS) registration with the network. The RRC_INACTIVE state refers to a state in which the UE has an AS registration with the network and periodically updates the AS registration when it changes a tracking area. In both the RRC_IDLE and RRC_INACTIVE states, the UE may measure signal quality or signal strength of frequencies in neighboring cells to determine whether to perform a cell reselection. The measurements may be based on a signal strength, such as received signal strength indicator (RSSI) or a received signal received power (RSRP). Alternatively, the measurement may be based on signal quality, such as a signal-to-interference-plus noise ratio (SINR) or a reference signal received quality (RSRQ). In some implementations, a network may provide a measurement configuration to enable the UE to measure signal strength or signal quality of one or more available frequencies of neighbor cells. The UE may periodically measure signal quality or signal strength to determine if another cell is suitable for the UE to camp. Alternatively, or additionally, the UE may measure signal quality or signal strength in response to a determination that MO data is available to send to the network or in response to receiving a page from the network indicating MT data for the UE.

In some implementations, the UE may determine a service mapping that indicates which services are available at different frequencies. For example, the service mapping may be transmitted from the network to the UE as part of a system information message, a measurement configuration, or in a Network Slice Selection Assistance Information (NSSAI) information element (IE), among other examples. The service mapping may indicate all or some of the services supported by the wireless communication system. As described in this disclosure, the UE may have a service relationship with one or more of the services but not other services. A UE may determine with which services the UE has a service relationship. A service relationship also may be referred to as an interest in a service or a determination that the service is relevant to the UE. For example, a service may be relevant to the UE when the UE has established a protocol data unit (PDU) session for the service or when the service is listed in an allowed NSSAI information element or a configured NSSAI information element that is specific to the UE. The UE may determine, from among those indicated in a service mapping, which services are relevant to the UE.

In some implementations, the UE may determine the frequencies that correspond to the services with which the UE has a service relationship. The UE may measure signal quality or signal strength of those determined frequencies when the UE is in an RRC_IDLE or RRC_INACTIVE state. The measurement results of the frequencies for services of interest may enable the UE to perform a cell reselection and connection more quickly to RRC_CONNECTED state when there is MO or MT data to send or receive for a particular service of interest. Furthermore, the UE may disregard or refrain from measuring those frequencies that correspond to other services with which the UE does not have a service relationship. Thus, the UE can reduce power consumption that would otherwise be consumed by measuring frequencies for other services and the UE can prioritize measurements of those frequencies that are most likely to be used by the UE for a particular service.

In some implementations, the UE may determine a service prioritization of services that are relevant to the UE. For example, the UE may prioritize a URLLC service as a higher priority than an eMBB service. Furthermore, the UE may determine a frequency prioritization of the one or more frequencies that correspond to the prioritized service or services. By prioritizing those frequencies that have a higher priority among the frequencies that correspond to a prioritized service, the UE can perform a cell reselection to a cell that is most suitable for the prioritized service. The UE can camp on the cell so that it can quickly access the service having the highest priority among those services with which the UE has a service relationship.

Particular implementations of the subject matter described in this disclosure can be implemented to realize one or more of the following potential advantages. Service priority-based camping may enable the UE to establish a radio connection more quickly when there is MO data to send or MT data to receive for a prioritized service. The UE may realize the advantages of URLLC by camping on a cell that supports URLLC and has a highest priority or frequency measurement from among those cells that support URLLC. Furthermore, the UE may reduce power consumption and delay that would otherwise occur if the UE measures signal quality or signal strength of frequencies which are not relevant to the UE or that correspond to a service having a lower priority.

FIG. 1 is a block diagram conceptually illustrating an example of a wireless communication system 100. The wireless communication system 100 may include an LTE RAN or some other RAN, such as a 5G or NR RAN. The wireless communication system 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS, a BS subsystem serving this coverage area, or a combination thereof, depending on the context in which the term is used. A UE may communicate with a base station via the downlink (DL) and uplink (UL). The DL (or forward link) refers to the communication link from the BS to the UE, and the UL (or reverse link) refers to the communication link from the UE to the BS.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless communication system 100 through various types of backhaul interfaces, such as a direct physical connection, a virtual network, or a combination thereof using any suitable transport network.

The wireless communication system 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, or a relay, among other examples.

The wireless communication system 100 may include a heterogeneous network that includes BSs of different types, for example, macro BSs, pico BSs, femto BSs, relay BSs, among other examples. These different types of BSs may have different transmit power levels, different coverage areas, and different impacts on interference in wireless communication system 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. The network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless communication system 100, and each UE may be stationary or mobile. A UE also may be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IOT) devices or may be implemented as NB-IOT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of RANs may be deployed in a given geographic area. Each RAN may support a particular RAT and may operate on one or more frequencies. A RAT also may be referred to as a radio technology, an air interface, among other examples. A frequency also may be referred to as a carrier, a frequency channel, among other examples. Each frequency may support a single RAT in a given geographic area in order to avoid interference between RANs of different RATs. In some cases, NR or 5G RANs may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a RAN with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
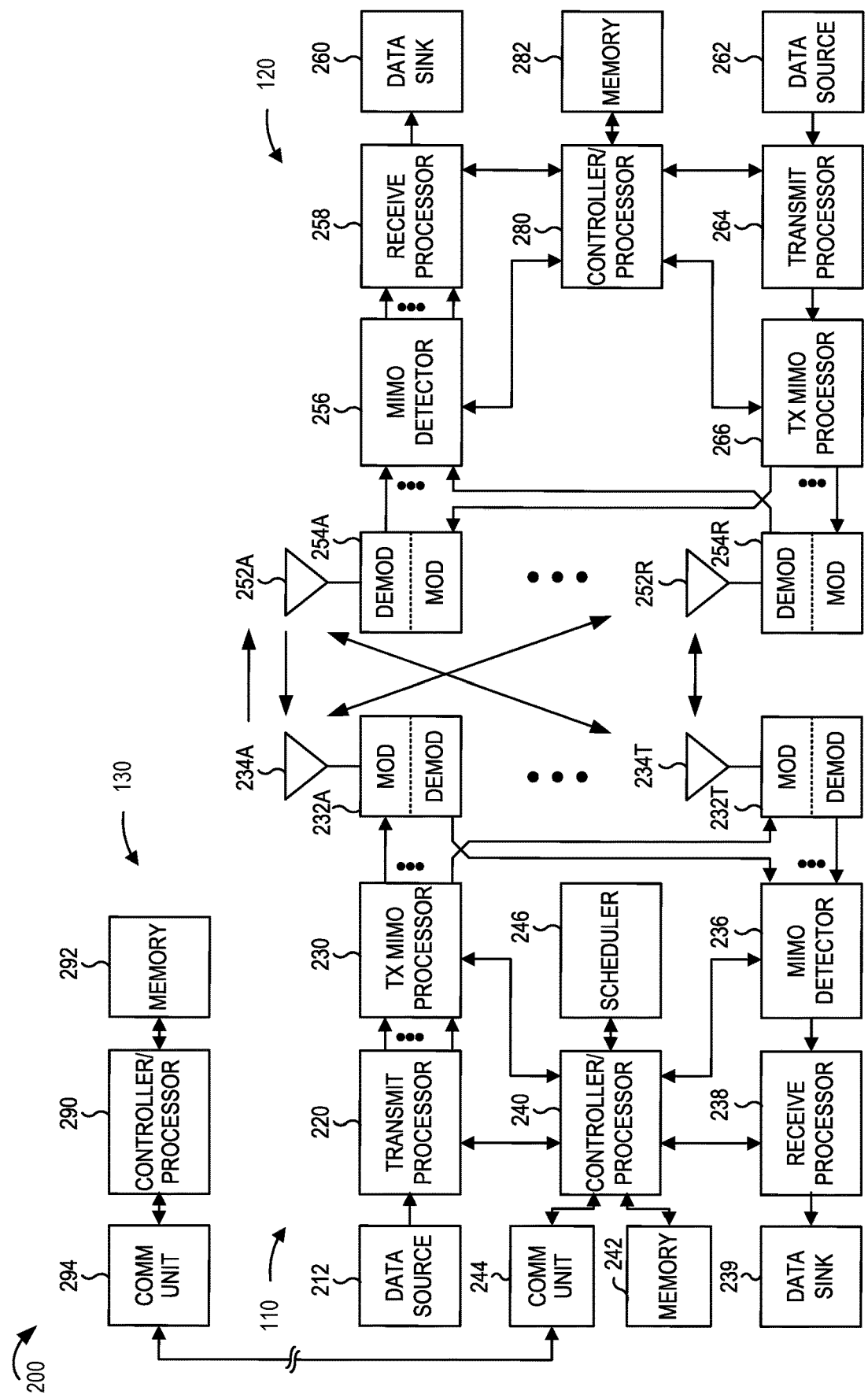
FIG. 2 shows a block diagram conceptually illustrating an example of a base station (BS) in communication with a user equipment (UE).

FIG. 2 is a block diagram conceptually illustrating an example 200 of a base station 110 in communication with a UE 120. In some aspects, the base station 110 and the UE 120 may respectively be one of the base stations and one of the UEs in wireless communication system 100 of FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI) or the like) and control information (for example, CQI requests, grants, upper layer signaling, among other examples.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 or other base stations and may provide received signals to demodulators (DE-MODs) 254a through 254r, respectively. Each demodulator 254 may condition (for example, filter, amplify, downconvert, and digitize) a received signal to obtain input samples. Each demodulator 254 may further process the input samples (for example, for OFDM) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine RSRP, RSSI, RSRQ, channel quality indicator (CQI), among other examples. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, among other examples) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, among other examples), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include a communication unit 244 and may communicate to the network controller 130 via the communication unit 244. The network controller 130 may include a communication unit 294, a controller or processor (i.e., controller/processor) 290, and memory 292.

The controller/processor 240 of base station 110, the controller/processor 280 of UE 120, or any other component(s) of FIG. 2 may implement an RRC protocol between the base station 110 and the UE 120. In some implementations, the controller/processor 240 may output frequency information, measurement configuration, service mapping, frequency prioritization or other information for transmission to the UE 120. The controller/processor 280 may manage of the UE 120 in accordance with implementations described in more detail elsewhere herein. For example, the controller/processor 280 of UE 120, or any other component(s) (or combinations of components) of FIG. 2 may perform or direct operations of, for example, processes 500, 600, or 800 of FIG. 5, 6, or 8, respectively, or other processes as described herein. The memories 242 and 282 may store data and program codes for base station 110 and UE 120, respectively. The stored program codes, when executed by the controller/processor 280 or other processors and modules at UE 120, may cause the UE 120 to perform operations described with respect to processes 500, 600, or 800 of FIG. 5, 6, or 8, respectively, or other processes as described herein. A scheduler 246 may schedule UEs for data transmission on the downlink, the uplink, or a combination thereof.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
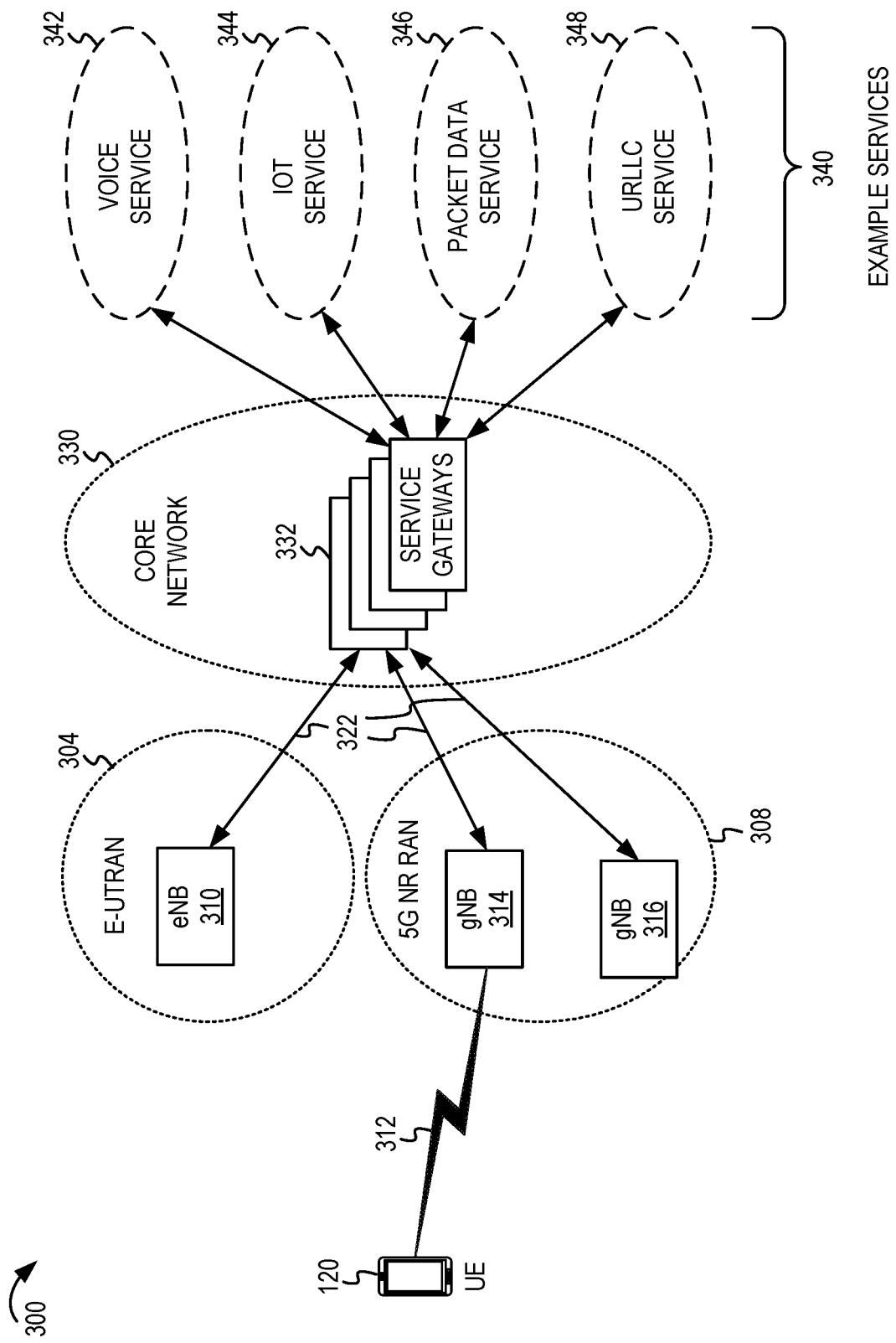
FIG. 3 shows a block diagram conceptually illustrating an example wireless communication system and example services.

FIG. 3 shows a block diagram conceptually illustrating an example wireless communication system 300 and example services 340. The wireless communication system 300 includes a UE 120, one or more radio access networks and a core network 330 that supports one or more services 340. The UE 120 may include components (not shown), such a wireless communication module and a connection controller, among other examples. In some implementations, a single chip or component of the UE 120 may provide the wireless communication module and the connection controller and may communicate via one or more radio components of the UE 120. The wireless communication module may be capable of establishing an RRC relationship (such as camping) with a particular cell. The UE 120 may refer to a portable electronic device or to one or more components of the portable electronic device.

In the example shown in FIG. 3, an LTE RAN 304 and a 5G NR RAN 308 are conceptually illustrated. For brevity, the examples in this disclosure are described in relation to a 5G NR RAN. However, the techniques for service-based cell reselection also may be applicable for other types of radio access networks. Each RAN may have one or more base stations. For example, the LTE RAN 304 may be an evolved universal terrestrial radio access network (E-UTRAN) and may include one or more base stations (such as eNB 310). The 5G NR RAN may include one or more base stations (such as gNBs 314 and 316). Each of the base stations may communicate with the core network 330. Each base station may operate multiple cells. In some traditional deployments, a base station may operate three (3) cells, but other quantities of cells may be deployed at a base station. Furthermore, each cell may utilize one or more frequencies. In some implementations, the wireless communication system 300 may support different services on various frequencies. For example, the wireless communication system 300 may support URLLC on a first frequency of a cell and may support eMBB on a different frequency of that cell or another cell. In some implementations, different base stations (such as gNBs 314 and 316) may implement different frequency bands and backhaul connections 322 to the core network 330 based on the type of services supported at those base stations.

The core network 330 may make up part of a non-access stratum (NAS) of the wireless communication system 300. In some implementations, the 5G NR RAN 308 and the LTE RAN 304 may use the same core network 330. Examples of a core network may include an evolved packet core (EPC) or a 5G Core (5GC). The core network 330 may include a variety of core network elements that maintain a registration status of the UEs in the wireless communication system 300. For example, an Access and Mobility Management Function (AMF) of a 5GC or a Mobility Management Entity (MME) of an EPC may maintain a tracking area registration that indicates which cell or cells the UE 120 is available to receive paging messages for MT data. When a UE 120 performs a cell selection or reselection, the UE 120 may establish an RRC relationship 312 with a base station (such as gNB 314) and send a tracking area update (TAU) registration to the AMF or MME of the wireless communication system 300. The tracking area associated with the gNB 314 may include one or more cells of the gNB 314 as well as neighboring cells of nearby base stations. When the UE 120 is in RRC_INACTIVE or RRC_IDLE state, the UE 120 may monitor for paging messages broadcast by the cells in the tracking area to determine whether to transition to an RRC_CONNECTED state with the cell on which the UE 120 is currently camped.

In the RRC_INACTIVE and RRC_IDLE state, UE 120 may measure signal quality or signal strength of neighboring cells to determine whether to select a different cell on which to camp. In some implementations, the gNB 314 may provide a measurement configuration to the UE 120 in an RRC message while the UE 120 is in the RRC_CONNECTED state. The measurement configuration may include frequency information indicating the available frequencies of various cells of nearby base stations. The UE 120 may transition to the RRC_INACTIVE state and monitor frequencies of neighboring cells based on the measurement configuration. Although a measurement configuration is one mechanism for the UE 120 to obtain the frequency information, there may be other mechanisms. For example, the UE 120 may obtain the frequency information by receiving a broadcast system information message from any of the base stations in its vicinity. Alternatively, or additionally, the UE 120 may obtain the frequency information in a dedicated message from a base station with which it has an RRC relationship. In some implementations, the frequency information may include frequency prioritization information that indicates which available frequencies are preferred over others.

The wireless communication system 300 may support different services. FIG. 3 illustrates some example services 340 that include a voice service 342, an IOT service 344, a packet data service 346, and an URLLC service 348. The services may be connected to various service gateways 332 or other elements of the core network 330. Furthermore, although the example services 340 are illustrated as separate from the RAN and core network 330, in some implementations the services supported by a wireless communication system 300 include elements or configurations of different elements within the RAN and the core network 330. For example, network slicing (further described in detail with regard to FIG. 9) may include a combination of elements or portions of elements within the wireless communication system 300 to support various services.

Ultra-reliable low-latency communication (URLLC) is one of several services supported by the 5G New Radio (NR) standard, as stipulated by 3GPP (3rd Generation Partnership Project). URLLC may be used by a variety of latency-sensitive applications such as factory automation, autonomous driving, the industrial internet and smart grid or robotic surgeries. By contrast, enhanced mobile broadband (eMBB) may support high bandwidth internet access for wireless connectivity, large-scale video streaming, and virtual reality. Another example service, Massive Machine Type Communication (mMTC) may support internet access for sensing, metering, and monitoring devices. Each of these example services may have different quality of service requirements for latency, throughput, and reliability. For example, the URLLC service may aim to reduce latency to 1 millisecond (ms) or less. To achieve the quality of service for different types of services, a wireless communication system 300 may implement different frequencies, different frequency bands, different cells, different base stations, different core network elements, or any combination thereof, for particular services. As described with reference to FIG. 9, network slicing also may be used to support the various quality of service associated with the different services.

In some implementations, a UE 120 may camp on a cell that is most suitable for a particular service with which the UE 120 has a service relationship. For example, the UE 120 may camp on a first cell of the gNB 314 that is optimized for URLLC if the UE 120 is configured to use the URLLC service 348. The UE 120 may measure frequencies of other cells (such as another cell of the gNB 314 or the gNB 316) to determine if one of the other cells would provide a stronger signal strength or higher signal quality for accessing the URLLC service 348. As the UE 120 moves in the environment, another cell may become a more suitable cell for the UE 120 to utilize for the URLLC service 348.

Figure 4A:
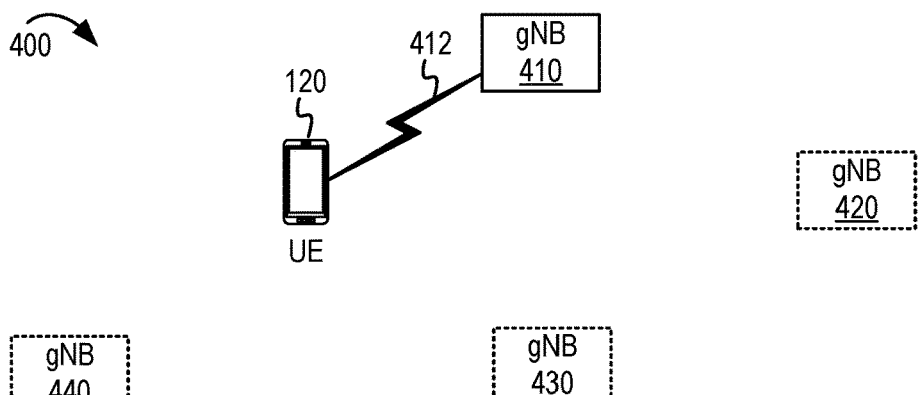
FIG. 4A shows a block diagram conceptually illustrating an example UE establishing a radio resource control (RRC) relationship with a first base station of an example wireless communication system.

FIG. 4A shows a block diagram conceptually illustrating an example UE 120 establishing an RRC relationship 412 with a first base station of an example wireless communication system 400. When the UE 120 first powers up, the UE 120 perform an initial cell selection procedure in which the UE searches for a suitable cell of the wireless communication system 400, registers its presence using a NAS registration procedure in the tracking area of the chosen cell, and monitors a control channel of the chosen cell. This procedure may be referred to as "camping on the cell." In the example of FIG. 4A, the UE 120 has selected a first cell of a first gNB 410. The UE 120 may or may not be aware of the other available cells or frequencies available at other base stations, such as the gNB 420, 430 and 440. In some implementations, the UE 120 may receive a broadcast system information message from the first cell of the first gNB 410. The broadcast system information message may include frequency information indicating available frequencies of various cells of the first gNB 410 or other base stations, such as the gNB 420, 430 and 440. In some implementations, the UE 120 may establish an initial RRC connection (RRC_CONNECTED state) with the first gNB 410 and receive the frequency information from the first gNB 410 via a system information message, measurement configuration, or other message from the first gNB 410. Later, the UE 120 may change from the RRC_CONNECTED state to an RRC_INACTIVE state.

The frequency information may indicate available frequencies in use by neighboring cells of nearby base stations. Referring to the example of FIG. 4A, the UE 120 may receive the frequency information from the first gNB 410. The frequency information may indicate the available frequencies that are in use at cells of the first gNB 410 and the other gNBs 420, 430 and 440 in the vicinity of the first gNB 410. As described further with reference to FIG. 4B, the UE 120 may measure the signal strength or signal quality of the available frequencies and perform a cell reselection based on the measurement results.

The UE 120 also may obtain a service mapping that indicates which services are supported by the available frequencies. For example, the service mapping may be included in a system information message or a dedicated message from the first gNB 410 to the UE 120. In some implementations, the service mapping may be included as an information element (IE) or system information block (SIB) of a message transmitted from the first gNB 410 to the UE 120. Thus, the first gNB 410 may provide a service mapping to the UE 120 that indicates which services are available at the various frequencies of the neighboring cells. The UE 120 may determine which frequencies of neighboring cells to measure for possible cell reselection based on those frequencies indicated in the service mapping to correspond to a particular service of interest to the UE 120.

Figure 4B:
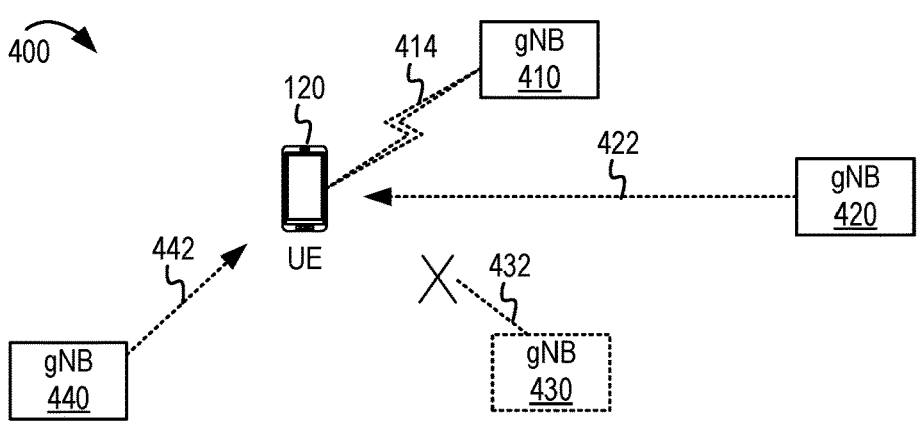
FIG. 4B shows a block diagram conceptually illustrating the example UE of FIG. 4B measuring signal quality or signal strength of frequencies associated with services of interest to the example UE.

FIG. 4B shows a block diagram conceptually illustrating the example UE 120 of FIG. 4B measuring signal quality or signal strength of frequencies associated with services of interest to the example UE 120. The wireless communication system 400 of FIG. 4B is the same as described with reference to FIG. 4A. The UE 120 may be camped 414 on a first cell of the first gNB 410. Alternatively, the UE 120 may not yet be camped 414 on any cell and may observe broadcast system information to obtain the frequency information, a service mapping, or both. Thus, the UE 120 may be in an RRC_INACTIVE or RRC_IDLE state. The UE 120 may measure the signal quality or the signal strength for a cell selection or cell reselection.

In the example of FIG. 4B, the UE 120 may determine that a second gNB 420 and a fourth gNB 440 supports a first service in which the UE 120 is interested. For example, the UE 120 may determine that it has a service relationship with the first service using the example process 800 of FIG. 8 or any of the techniques described herein. The first service may have a higher priority from among one or more services supported by the UE 120. In the example of FIG. 4B, a first gNB 410 and a third gNB 430 may not support the first service. Thus, even though the UE 120 may initially camp 414 on a first cell of the first gNB 410, the first cell of the first gNB 410 may not be suitable for the first service that the UE 120 has prioritized.

The UE 120 may measure signal quality or signal strength of those frequencies of neighboring cells that support the first service. Thus, the UE 120 may measure the signal strength or signal quality of frequencies 422 and 442 in use at cells of the second gNB 420 and the fourth gNB 440. In some implementations, the UE 120 may disregard frequencies of the other gNBs, such as the frequencies 432 in use at the third gNB 430. The UE 120 may refrain from measuring the frequencies 432 or may refrain from performing a cell reselection to the gNB 430 based on a determination that the frequencies 432 are not indicated as corresponding to the first service in the service mapping.

Figure 4C:
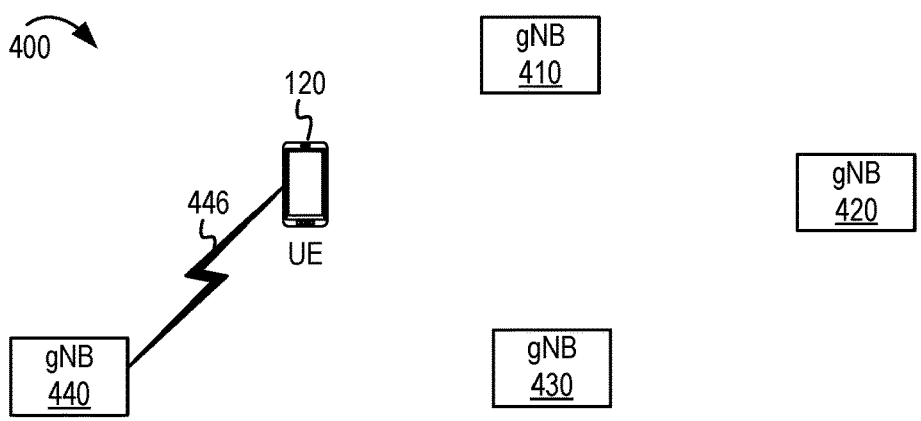
FIG. 4C shows a block diagram conceptually illustrating the example UE of FIG. 4A performing a cell reselection based on the measurement results obtained in FIG. 4B.

FIG. 4C shows a block diagram conceptually illustrating the example UE 120 of FIG. 4A performing a cell reselection based on the measurement results obtained in FIG. 4B. The wireless communication system 400 of FIG. 4C is the same as described with reference to FIGS. 4A and 4B. Based on the measurement results for the frequencies that correspond to the first service, the UE 120 may determine that the fourth gNB 440 has a more suitable cell for the UE 120 (compared to the first cell of the first gNB 410 where it was previously camped). The UE 120 may perform a cell reselection to camp 446 on the suitable cell of the fourth gNB 440. For example, the UE 120 may monitor a control channel, paging channel, or other broadcast information from the fourth gNB 440 to determine whether there is MT data for the UE 120. If the fourth gNB 440 is in a different tracking area than the first gNB 410, the UE 120 also may perform a tracking area update registration to inform the wireless communication system 400 regarding its presence in the tracking area that includes the fourth gNB 440.

Referring collectively to FIGS. 4A, 4B and 4C, an example of service-based camping can be described. The UE 120 may be interested in an URLLC service or the URLLC service may have a highest priority among the services with which the UE 120 has a service relationship. The UE 120 may initially camp on a first cell of the first gNB 410 so that it can obtain the frequency information and service mapping. The frequency information may indicate available frequencies of the nearby cells at the gNBs 410, 420, 430 and 440. In some implementations, the frequency information may be provided to the UE 120 via a system information message. In addition to information traditionally provided in a system information message, the UE 120 also may obtain a service mapping that indicates which frequencies support various services. Using the service mapping, the UE 120 may determine the frequencies that support the prioritized service (URLLC) and measure the signal strength or signal quality of signals at those frequencies and may disregard or refrain from measuring the other frequencies. After determining that the fourth gNB 440 has a higher priority, higher signal strength, or higher signal quality from among the frequencies measured, the UE 120 may camp on the fourth gNB 440. By camping on the gNB 440, the UE 120 can quickly activate an RRC connection with the fourth gNB 440 when it has URLLC data to send or when it receives an indication from the fourth gNB 440 that there is URLLC data for the UE 120. Furthermore, by disregarding frequencies that correspond to services not relevant to the UE 120, the UE 120 may increase the speed of performing a cell reselection, may reduce power consumption and may conserve batter power.

FIG. 5 shows a flowchart illustrating a first example process 500 for measuring signal quality or signal strength of frequencies based on a service relationship. The operations of the process 500 may be implemented by a wireless communication device, a UE, or any component thereof as described herein. In some implementations, the process 500 (or portions thereof) may be performed by a UE, such as one of the example UEs 120 described with reference to FIGS. 1, 2, 3, 4A, 4B and 4C, respectively. In some implementations, the process 500 may be performed by a wireless communication device, such as the wireless communication device 1100 or 1200 described with reference to FIGS. 11 and 12, respectively. For brevity, the example process 500 is described as being performed by an apparatus that could be any of the above indicated UEs, wireless communication device, or a component thereof.

In block 510, the apparatus may receive frequency information indicating available frequencies of one or more cells of at least a first base station of a wireless communication network.

In block 520, the apparatus may receive a service mapping that indicates which available frequencies correspond to which available services of the wireless communication network, wherein the UE has a service relationship with one or more services of the available services. For example, the service mapping may be received by the apparatus in a system information message, measurement configuration, dedicated message, or other communication from the first cell of the first base station.

In block 530, the apparatus may measure signal quality or signal strength of one or more frequencies of the available frequencies based on the service mapping, the one or more frequencies including those that correspond to the one or more the services with which the UE has the service relationship. In some implementations, the apparatus may determine which services it has a service relationship using one or more example operations described with reference to FIG. 8. In some implementations, the apparatus may perform a cell reselection if a frequency of the one or more frequencies has a higher priority, higher signal strength or higher signal quality compared to the cell on which the UE is presently camped.

Figure 6:
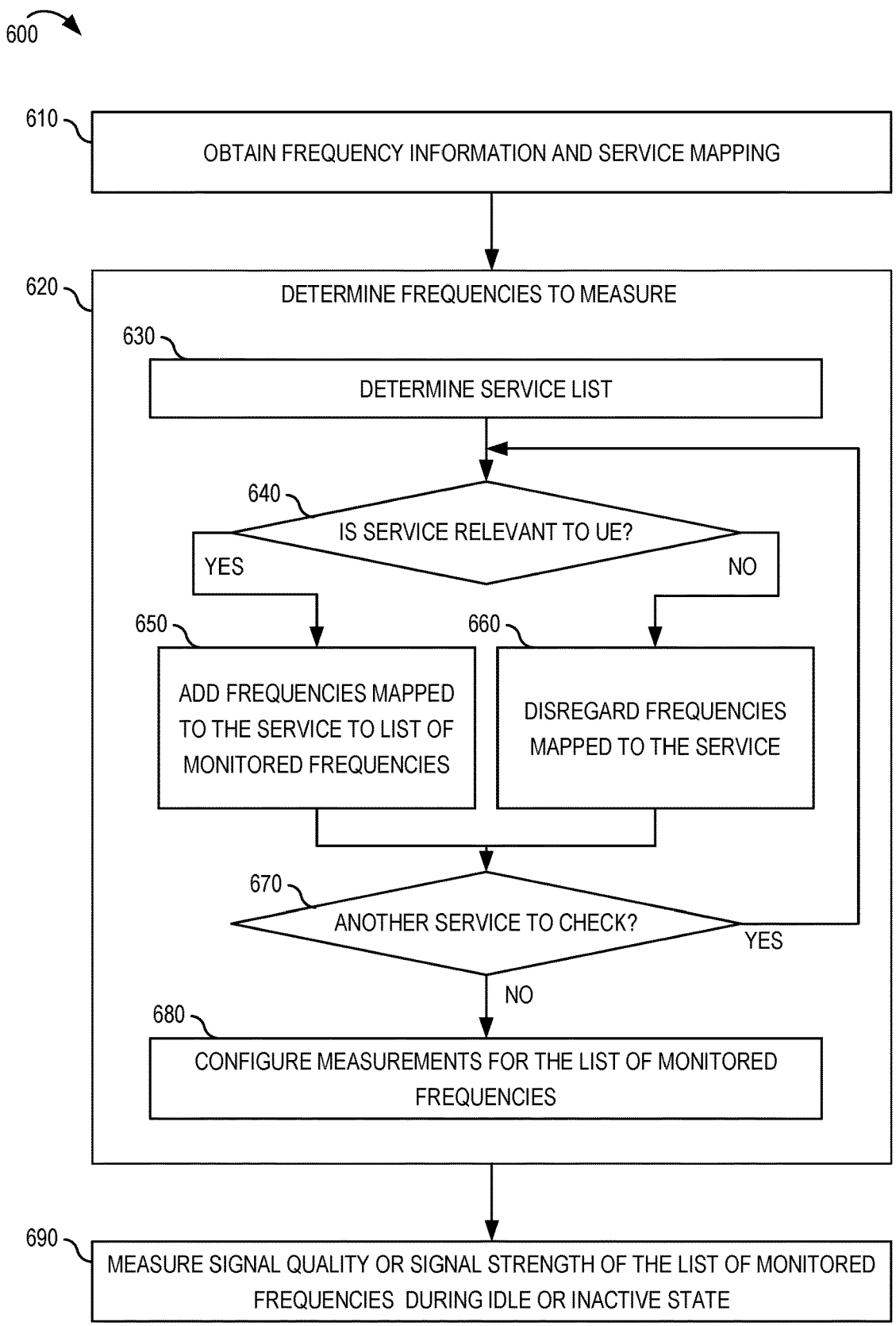
FIG. 6 shows a flowchart illustrating a second example process for measuring signal quality or signal strength of frequencies based on a service relationship.

FIG. 6 shows a flowchart illustrating a second example process for measuring signal quality or signal strength of frequencies based on a service relationship. The operations of the process 600 may be implemented by a wireless communication device, a UE, or any component thereof as described herein. In some implementations, the process 600 (or portions thereof) may be performed by a UE, such as one of the example UEs 120 described with reference to FIGS. 1, 2, 3, 4A, 4B and 4C, respectively. In some implementations, the process 600 may be performed by a wireless communication device, such as the wireless communication device 1100 or 1200 described with reference to FIGS. 11 and 12, respectively. For brevity, the example process 600 is described as being performed by an apparatus that could be any of the above indicated UEs, wireless communication device, or a component thereof.

In block 610, the apparatus may obtain frequency information and a service mapping. In some implementations, the service mapping may be included in a same message that includes the frequency information. Alternatively, or additionally, the service mapping may be provided by the wireless communication network to the apparatus via a broadcast message or a dedicated message.

In block 620, the apparatus may determine one or more frequencies to measure for a cell reselection. The one or more frequencies may be selected from among available frequencies in the frequency information. More particularly, the one or more frequencies may be selected based on their relevance to one or more services of interest to the apparatus. Blocks 630-680 include some example operations that may be used to determine one or more frequencies to measure.

In block 630, the apparatus may determine a service list. In some implementations, the service list may include those services that are supported by the wireless communication system. Alternatively, or additionally, the service list may be based on a preconfigured list of services defined by a technical specification for the wireless communication system. In some implementations, the service list includes services that are potentially relevant or not relevant to the apparatus. For one or more services in the service list, the apparatus may perform operations of blocks 640-660. In some implementations, the apparatus may begin with a first service that has a highest service prioritization. The service prioritization may be a predetermined priority, user-configurable, system-configurable, or manufacturer-configurable priority ranking of those services that are supported by the apparatus.

Figure 8:
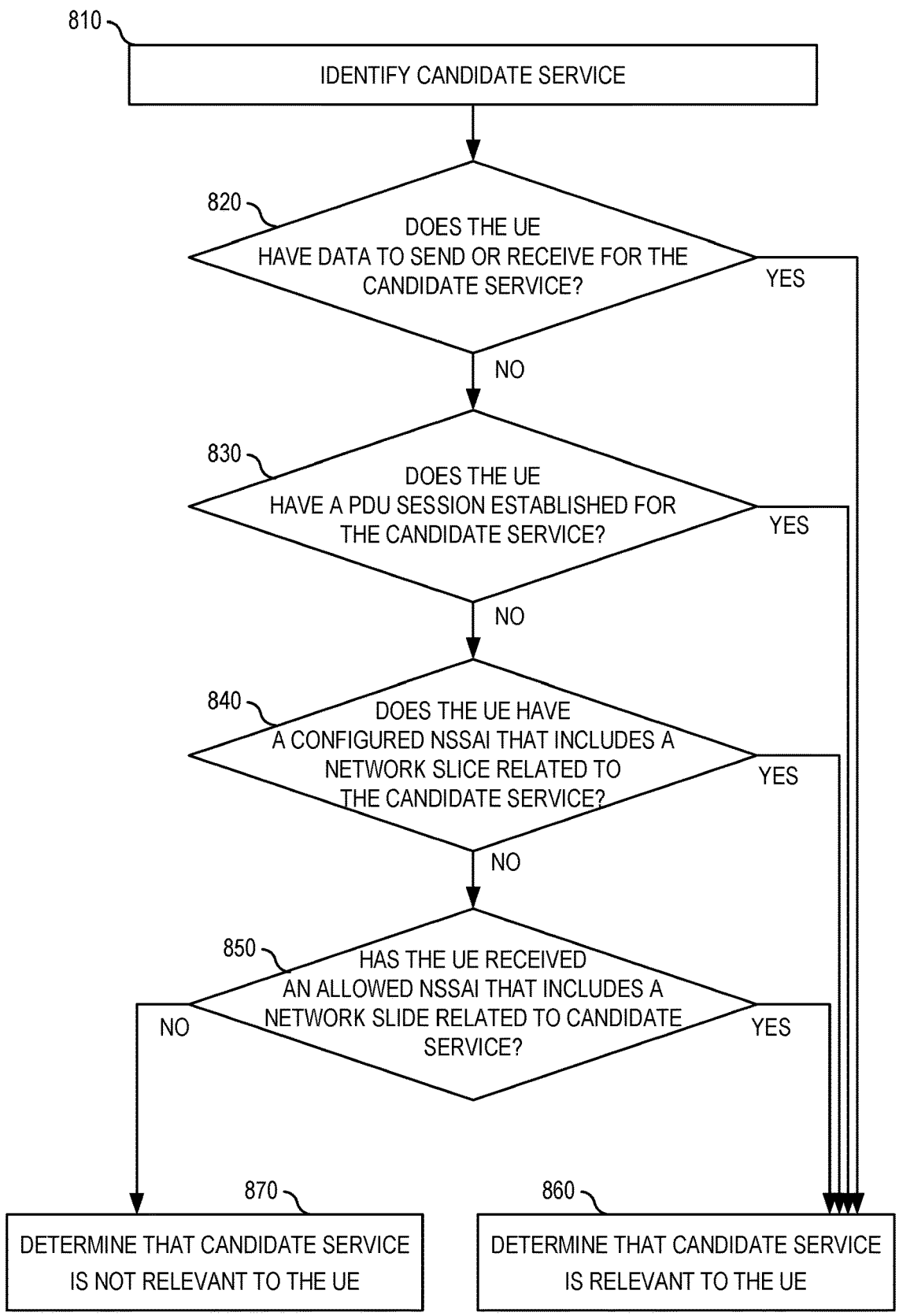
FIG. 8 shows a flowchart illustrating an example process for determining which service or services are relevant to a UE.

In block 640, the apparatus may determine whether the service is relevant to the apparatus. If so, the process 600 may continue to block 650. Otherwise, the process 600 may continue to block 660. FIG. 8 includes example operations which may be used to determine whether a service is relevant to the apparatus. In block 650, if the service is relevant to the apparatus, the apparatus may add the frequencies that correspond to that service (as indicated in the service mapping) to a list of monitored frequencies to measure. The list of monitored frequencies may be maintained so that the UE can periodically measure signal strength or signal quality to determine if a neighbor cell is more suitable for the UE to obtain access to the service. Otherwise, in block 660, if the service is not relevant to the apparatus, the apparatus may disregard the frequencies indicated in the service mapping as corresponding to that service. In some implementations, the UE may add the disregarded frequencies to a list of excluded frequencies so that the UE may refrain from measuring signal quality or signal strength of cells on the list of excluded frequencies. After performing the operations in blocks 640-660 for the first service, the process 600 may continue to block 670.

In block 670, the apparatus may determine whether there is another service from the service list prepared in block 630 to check. If so, the apparatus may perform the operations in blocks 640-660 for the next service. Otherwise, the apparatus may continue to block 680. In some implementations, in block 670 a decision whether to check relevance of another service may be based on how many frequencies are already included in the list of monitored frequencies. For example, if after performing operations of blocks 640-660 for a highest prioritized service there are a sufficient quantity of frequencies in the list of monitored frequencies, the apparatus may refrain from checking for the next highest prioritized service. Alternatively, or additionally, the apparatus may traverse the service list to determine frequencies for all services that are relevant to the apparatus. In some implementations, the apparatus may determine service prioritization data and frequency prioritization data for each frequency in the list of monitored frequencies. Any appropriate data structure may be used to maintain the list of monitored frequencies and prioritization data related to those frequencies.

In block 680, the apparatus may configure a measurement procedure to measure the frequencies in the list of monitored frequencies determined in block 620. The measurement procedure may include measuring the RSRP or the RSRQ of signals at the frequencies.

In block 690, the apparatus may measure signal quality or signal strength of the frequencies when the apparatus is in an idle or inactive state. For example, in the RRC_IDLE state or the RRC_INACTIVE state, the apparatus may periodically measure the frequencies in the list of monitored frequencies. The apparatus may use the measurement results to determine whether to perform a cell reselection to a cell associated with a measured frequency.

FIG. 7A shows an example service mapping 701. For illustrative purposes, the example service mapping 701 is depicted as a table. However, the service mapping 701 may be organized in any data structure suitable for indicating a relationship between available frequencies and the services supported by a wireless communication system that correspond to those frequencies. In the example service mapping 701, there are nine available frequencies (indicated as FREQ 1 to FREQ 9). In some implementations, the available frequencies may be in different radio access networks that support different radio access technologies (indicated as RAT 1 to RAT 3). In other implementations, the RAT may not be included in a service mapping.

In the example service mapping 701, there are five services (indicated as SERVICE 1 to SERVICE 5). Referring to the table in FIG. 7A, FREQ 1 supports SERVICE 1 and SERVICE 2,
FREQ 2 supports SERVICE 1 and SERVICE 3,
FREQ 3 supports SERVICE 1,
FREQ 4 supports SERVICE 4 and SERVICE 5,
FREQ 5 supports SERVICE 2 and SERVICE 3,
FREQ 6 supports SERVICE 1 and SERVICE 5,
FREQ 7 supports SERVICE 2,
FREQ 8 supports SERVICE 1 and SERVICE 4, and
FREQ 9 supports SERVICE 2 and SERVICE 3.

Although referred to generically as FREQ or SERVICE, the frequencies and services may be identified by any reference that enables a UE to determine which frequencies correspond to various services. Merely to provide context, as an example, SERVICE 1 may be an eMBB service and SERVICE 5 may be an URLLC service. FREQ 1 may be a frequency within a 2.6 GHz frequency band (2575-2635 MHz) and FREQ 4 may be a frequency within a 4.9 GHz frequency band (4800-4900 MHZ).

FIG. 7B shows an example selection of frequencies 702 based on the service mapping of FIG. 7A. Using an example in which the UE has a service relationship to SERVICE 5, the UE may determine that FREQ 4 and FREQ 6 are the frequencies within the service mapping that correspond to SERVICE 5. FREQ 4 and FREQ 6 are bolded in the example selection of frequencies 702 to indicate that those are the frequencies determined to correspond to the service of interest (SERVICE 5). Thus, if the UE is not interested in SERVICE 1, 2, 3 and 4, the UE may disregard the frequencies (FREQ 1, 2, 3, 5, 7, 8 and 9) that correspond to those services and that do not support SERVICE 5.

Returning to the contextual example in which SERVICE 5 is an URLLC service with which the UE has a service relationship, it should be apparent that by limiting the quantities of frequencies to measure the UE may more quickly measure and perform cell reselection to a frequency (FREQ 4 or FREQ 5) that supports the URLLC service.

FIG. 8 shows a flowchart illustrating an example process 800 for determining which service or services are relevant to a UE. For example, the process 800 may be used to determine whether the UE has a service relationship with a particular service. The operations of the process 800 may be implemented by a wireless communication device, a UE, or any component thereof as described herein. In some implementations, the process 800 (or portions thereof) may be performed by a UE, such as one of the example UEs 120 described with reference to FIGS. 1, 2, 3, 4A, 4B and 4C, respectively. In some implementations, the process 800 may be performed by a wireless communication device, such as the wireless communication device 1100 or 1200 described with reference to FIGS. 11 and 12, respectively. For brevity, the example process 800 is described as being performed by an apparatus that could be any of the above indicated UEs, wireless communication device, or a component thereof.

In block 810, the apparatus my identify a candidate service. The candidate service may be one which the apparatus is attempting to determine whether it has a service relationship with the candidate service. Using considerations in blocks 820-850, the apparatus may determine whether it has a service relationship with the candidate service. If the apparatus has a service relationship with the candidate service, that service is of interest and is relevant to the apparatus.

In block 820, the apparatus may determine if it has traffic to send or receive for the candidate service. For example, the traffic may be associated with a domain name (such as a fully qualified domain name (FQDN), Internet address (such as an Internet protocol (IP) address), port (such as a transmission control protocol (TCP) or a user datagram protocol (UDP)), or a protocol identification (ID) associated with the candidate service. If so, the process may continue to block 860 in which the apparatus determines that the candidate service is relevant to the UE. Otherwise, the process may continue to block 830.

In block 830, the apparatus may determine if it has a packet data unit (PDU) session established for the candidate service. A PDU session may be established, for example, as part of a service registration to a packet gateway of the core network. If the apparatus has a PDU session established for the candidate, the process may continue to block 860 in which the apparatus determines that the candidate service is relevant to the UE. Otherwise, the process may continue to block 840.

In block 840, the apparatus may determine if it has a configured NSSAI that includes a network slice related to the candidate service. As will be described in further detail with reference to FIG. 9, an NSSAI may indicate one or more network slices which are configured or allowed for a UE. A network slice may be identified by a slice/service type (SST) indicator. In some implementations, the UE may receive a message from the network indicating one or more network slices that have been configured for the UE. If one of the configured network slices has an SST matching the candidate service, the apparatus may determine that the configured NSSAI includes the network slice related to the candidate service. If so, the process may continue to block 860 in which the apparatus determines that the candidate service is relevant to the UE. Otherwise, the process may continue to block 850.

In block 850, the apparatus may determine if it has an allowed NSSAI that includes a network slice related to the candidate service. Similar to the configured NSSAI described in block 830, the UE may receive a message from the network indicating one or more network slices are allowed for use by the UE. If one of the allowed network slices has an SST matching the candidate service, the apparatus may determine that the allowed NSSAI includes the network slice related to the candidate service. If so, the process may continue to block 860 in which the apparatus determines that the candidate service is relevant to the UE. Otherwise, the process may continue to block 870.

In block 870, the apparatus may determine that the candidate service is not relevant to the UE and that the UE does not have a service relationship with the candidate service.

Although described as a series of blocks 820-850, the considerations in blocks 820-850 may be arranged in a different order or may include just some of the considerations described in those blocks.

Figure 9:
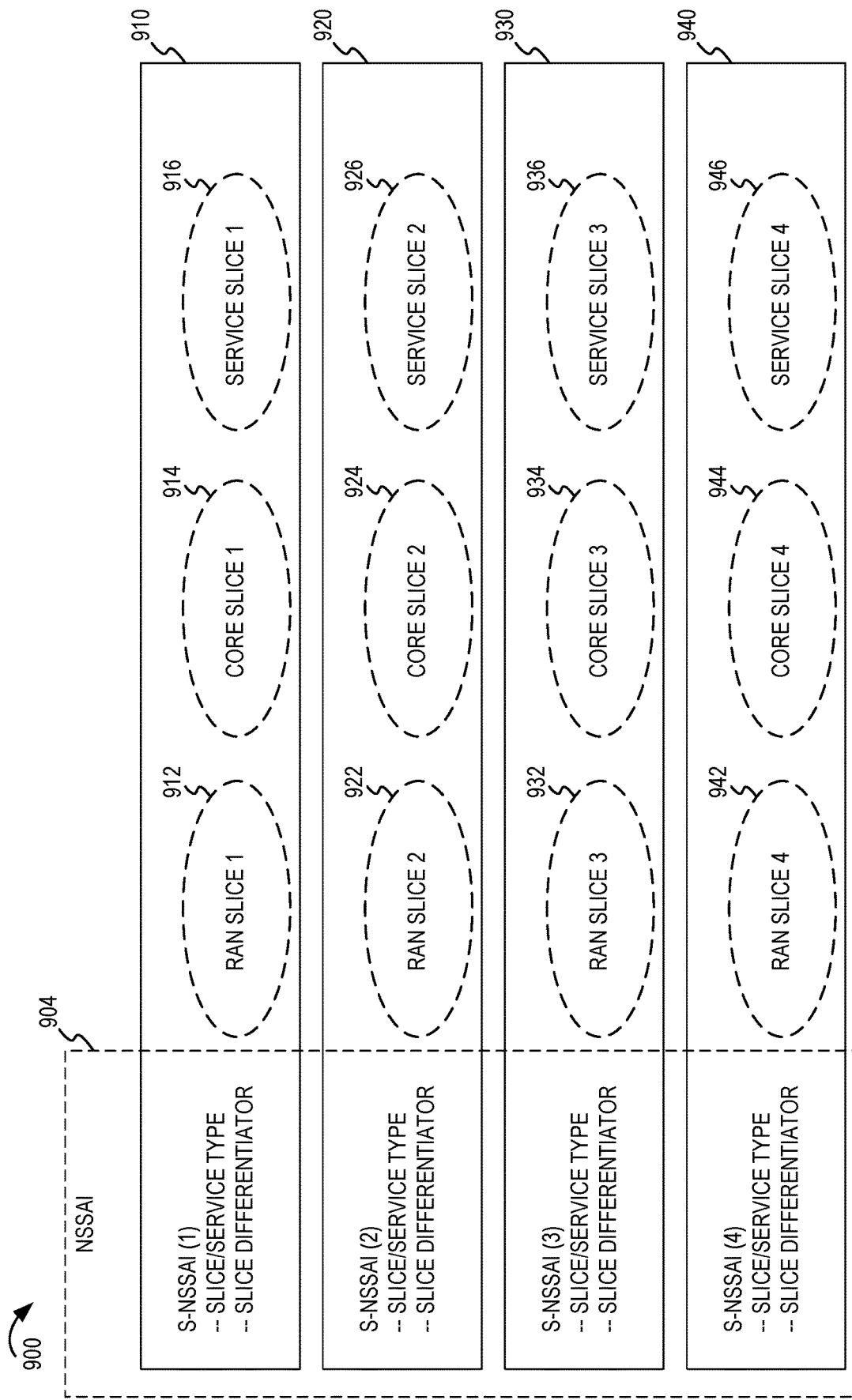
FIG. 9 shows a logical diagram illustrating network slice selection assistance information.

FIG. 9 shows a logical diagram 900 illustrating network slice selection assistance information. Network slicing is a network architecture that enables the multiplexing of virtualized and independent logical networks on the same physical network infrastructure. A network slice may include a set of network functions and resources so that it can operate as a complete logical network within a wireless communication system. For example, a base station may be logically partitioned so that a first logical portion of the base station belongs to a first network slice and a second logical portion of the base station belongs to a second network slice. Each network slice may include a service layer, a network function layer, and a logical network layer (sometimes also referred to as an infrastructure layer or resource layer). Despite being partitioned into network slices, some portions of the network slices may be implemented in the same hardware components. By defining network slices, a wireless communication system can designate different quality of service or configurations for each service. For example, each network slice can have its own architecture, management, and security to support a specific service. While functional components and resources may be shared across network slices, capabilities such as data speed, capacity, connectivity, quality, latency, reliability, and services can be customized in each slice to conform to the service. Each network slice may be identified by a single network slice selection assistance information (S-NSSAI) identifier. The S-NSSAI includes a slice/service type (SST) value and optionally includes a slice differentiator (SD) value.

The logical diagram 900 shows 4 example network slices 910, 920, 930 and 940. The first network slice 910 may include a RAN slice 912, a core slice 914 and a service slice 916. The first network slice 910 may be identified by a first S-NSSAI (1). Similarly, the second network slice 920 may include a RAN slice 922, a core slice 924 and a service slice 926 and may be identified by a second S-NSSAI (2). The third network slice 930 may include a RAN slice 932, a core slice 934 and a service slice 936 and may be identified by a third S-NSSAI (3). The fourth network slice 940 may include a RAN slice 942, a core slice 944 and a service slice 946 and may be identified by a fourth S-NSSAI (4). Although shown as separate elements, the RAN slices 912, 922, 932 and 942 may be implemented as logical slices of cell, frequency resource or processing capability within a base station, for example.

The wireless communication system may send network slice selection assistance information (NSSAI) 904 to a UE to indicate which network slices (S-NSSAIs) are configured or allowed for the UE to use. For example, if a UE is configured to use a second service represented by the second network slice 920 and a third service represented by the third network slice 930, the NSSAI 904 may include the identifiers of those network slices (S-NSSAI(2) and S-NSSAI(3)) in a message to the UE.

In some cases, the SST may be a predefined value that represents a particular service. For example, a value of "1" in the SST of S-NSSAI(1) may indicate that the first network slice 910 is an eMBB service. In some cases, an operator of a wireless communication system may designate custom values for the SST based on services that the operate has partitioned into separate network slices.

In some aspects, a UE may determine which services are relevant to the UE based on the configured NSSAI or allowed NSSAI for that UE. For example, if the configured NSSAI for a UE includes an indicator for a network slice having and SST value of "1," the UE may determine that it has a service relationship with the eMBB service. As described herein, a service mapping may indicate which services correspond to different frequencies of nearby cells. Thus, if the eMBB service is relevant to the UE, the UE may determine which frequencies in the service mapping correspond to the eMBB service.

Figure 10:
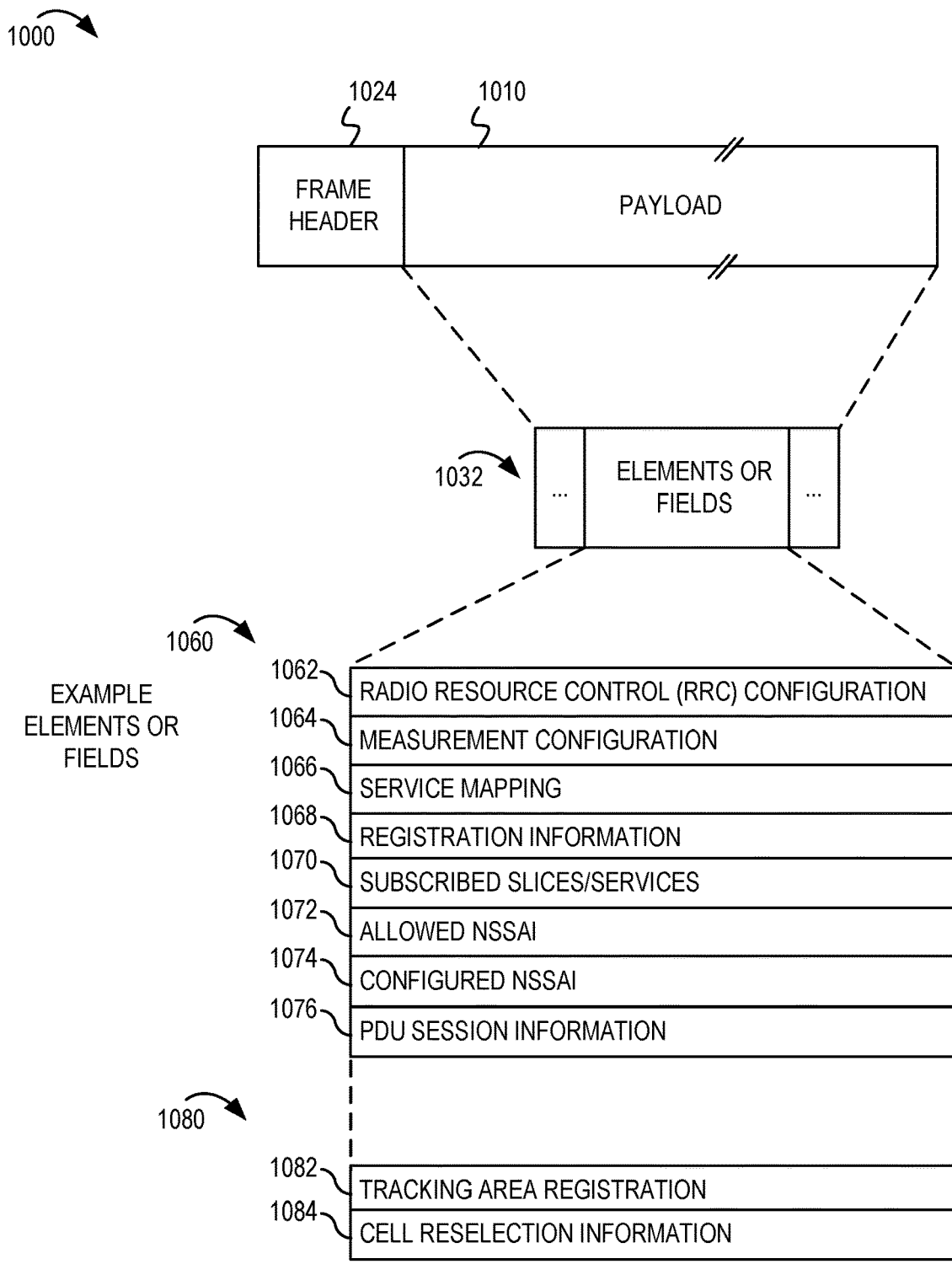
FIG. 10 shows a conceptual diagram of an example message that supports cell reselection based on service relationship according to some implementations.

FIG. 10 shows a conceptual diagram of an example message 1000 to trigger a wireless service reconnection according to some implementations. The message 1000 may include a frame header 1024 and a payload 1010. The frame header 1024 may indicate the type of message or other frame control information. The payload 1010 may include a variety of elements or fields 1032. The elements or fields also may be referred to as information elements in some message formats. FIG. 10 includes several example elements or fields 1060 that may be sent from a base station to a UE and also includes several example elements or fields 1080 that may be sent from a UE to a base station.

In some implementations, the example elements or fields 1060 may include an RRC configuration 1062. For example, the RRC configuration 1062 may be sent as part of a tracking area registration or when establishing an RRC relationship between a UE and a base station. The example elements or fields 1060 may include a measurement configuration 1064. The measurement configuration 1064 may indicate, among other things, available frequencies and thresholds for the UE to use as part of a cell reselection procedure. The example elements or fields 1060 may include a service mapping 1066 indicating which services correspond to available frequencies. In some implementations, the example elements or fields 1060 may include registration information 1068, such as a confirmation that the UE has registered its location in a particular tracking area. In some implementations, the example elements or fields 1060 may include a list of subscribed slices/services 1070, allowed NSSAI 1072, or configured NSSAI 1074. In some implementations, the example elements or fields 1060 may include PDU session information 1076. As described with reference to FIG. 8, one or more of the example elements of fields 1060 may be usable by a UE to determine with which services the UE has a service relationship.

In some implementations, the example elements or fields 1080 may include a tracking area registration update 1082.

For example, if the UE selects a cell that is in a different tracking area than it is currently registered, the UE may send a tracking area registration update 1082 to inform the wireless communication system of its presence in the new tracking area. In some implementations, the example elements or fields 1080 may include cell reselection information 1084 such as a measurement report or an RRC reconfiguration request.

Figure 11:
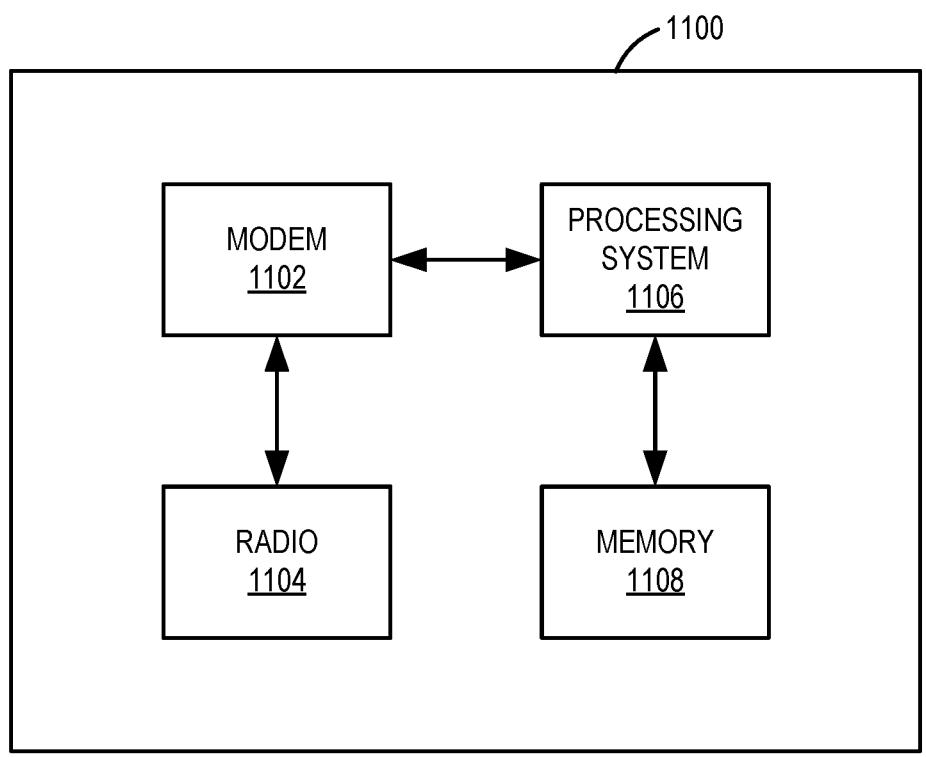
FIG. 11 shows a block diagram of an example wireless communication device that supports cell reselection based on service relationship.

FIG. 11 shows a block diagram of an example wireless communication device 1100 that supports cell reselection based on service relationship. In some implementations, the wireless communication device 1100 can be an example of a device for use in a UE, such as the UE 120 described above with reference to FIG. 1, 2, 3, 4A, 4B, or 4C. The wireless communication device 1100 is capable of transmitting (or outputting for transmission) and receiving wireless communications.

The wireless communication device 1100 can be, or can include, a chip, system on chip (SoC), chipset, package or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The wireless communication device 1100 may include one or more modems 1102. In some implementations, the one or more modems 1102 (collectively "the modem 1102") may include a WWAN modem (for example, a 3GPP 4G LTE or 5G compliant modem). In some implementations, the wireless communication device 1100 also includes one or more radios (collectively "the radio 1104"). In some implementations, the wireless communication device 1100 further includes one or more processors, processing blocks or processing elements (collectively "the processing system 1106") and one or more memory blocks or elements (collectively "the memory 1108"). In some implementations, the processing system 1106 can include the memory 1108.

The modem 1102 can include an intelligent hardware block or device such as, for example, an application-specific integrated circuit (ASIC) among other possibilities. The modem 1102 is generally configured to implement a PHY layer. For example, the modem 1102 is configured to modulate packets and to output the modulated packets to the radio 1104 for transmission over the wireless medium. The modem 1102 is similarly configured to obtain modulated packets received by the radio 1104 and to demodulate the packets to provide demodulated packets. In addition to a modulator and a demodulator, the modem 1102 may further include digital signal processing (DSP) circuitry, automatic gain control (AGC), a coder, a decoder, a multiplexer and a demultiplexer. For example, while in a transmission mode, data obtained from the processing system 1106 is provided to a coder, which encodes the data to provide encoded bits. The encoded bits are mapped to points in a modulation constellation (using a selected MCS) to provide modulated symbols. The modulated symbols may be mapped to a number NSS of spatial streams or a number NSTS of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 1104. In implementations involving beamforming, the modulated symbols in the respective spatial streams are precoded via a steering matrix prior to their provision to the IFFT block.

While in a reception mode, digital signals received from the radio 1104 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processing system 1106) for processing, evaluation, or interpretation.

The radio 1104 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 1100 can include, or be coupled with, multiple transmit antennas (each with a corresponding transmit chain) and multiple receive antennas (each with a corresponding receive chain). The symbols output from the modem 1102 are provided to the radio 1104, which transmits the symbols via the coupled antennas. Similarly, symbols received via the antennas are obtained by the radio 1104, which provides the symbols to the modem 1102.

The processing system 1106 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processing system 1106 processes information received through the radio 1104 and the modem 1102, and processes information to be output through the modem 1102 and the radio 1104 for transmission through the wireless medium. In some implementations, the processing system 1106 may generally control the modem 1102 to cause the modem to perform various operations described above.

The memory 1108 can include tangible storage media such as random-access memory (RAM) or read-only memory (ROM), or combinations thereof. The memory 1108 also can store non-transitory processor- or computer-executable software (SW) code containing instructions that, when executed by the processing system 1106, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 12:
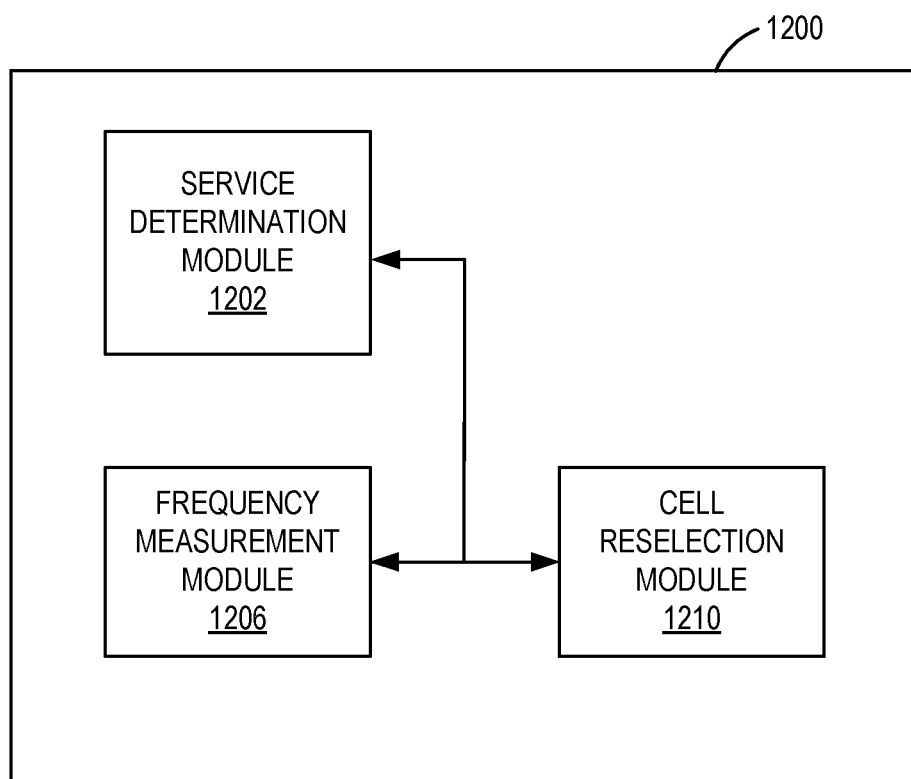
FIG. 12 shows a block diagram of another example wireless communication device that supports cell reselection based on service relationship.

FIG. 12 shows a block diagram of another example wireless communication device 1200 that supports cell reselection based on service relationship. In some implementations, the wireless communication device 1200 is configured to perform one or more of the processes 500, 600 and 800 described above with reference to FIGS. 5, 6 and 8, respectively. The wireless communication device 1200 may be an example implementation of the wireless communication device 1100 described above with reference to FIG. 11. For example, the wireless communication device 1200 can be a chip, SoC, chipset, package or device that includes at least one modem (for example, a Wi-Fi (IEEE 802.11) modem or a cellular modem such as the modem 1102), at least one processor (such as the processing system 1106), at least one radio (such as the radio 1104) and at least one memory (such as the memory 1108). In some implementations, the wireless communication device 1200 can be a device for use in a UE, such as one of the UEs 120 described with reference to FIGS. 1, 2 and 3, respectively. In some other implementations, the wireless communication device 1200 can be a UE that includes such a chip, SoC, chipset, package or device as well as at least one antenna.

The wireless communication device 1200 may include a service determination module 1202, a frequency measurement module 1206, and a cell reselection module 1210. Portions of one or more of the components 1202, 1206 and 1210 may be implemented at least in part in hardware or firmware. For example, the frequency measurement module 1206 may be implemented at least in part by a modem (such as the modem 1102). In some implementations, at least some of the components 1202, 1206 and 1210 are implemented at least in part as software stored in a memory (such as the memory 1108). For example, portions of one or more of the components 1202, 1206 and 1210 can be implemented as non-transitory instructions (or "code") executable by a processor (such as the processing system 1106) to perform the functions or operations of the respective module.

The service determination module 1202 may be configured to determine one or more services with which the UE has a service relationship.

The frequency measurement module 1206 may be configured to determine one or more frequencies that correspond to the one or more services with which the UE has a service relationship. For example, the frequency measurement module 1206 may determine the one or more frequencies from a service mapping that indicates which available frequencies correspond to various services. The frequency measurement module 1206 also may be configured to measure signal quality or signal strength of the one or more frequencies based on a service prioritization, a frequency prioritization, or both.

The cell reselection module 1210 may be configured to reselect a new cell for the UE to camp on based on the measurement results obtained by the frequency measurement module 1206.

FIGS. 1-12 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (enumerated as clauses for clarity).

CLAUSES

Clause 1. A method for wireless communication by an apparatus of a user equipment (UE), including: obtaining frequency information indicating available frequencies of one or more cells of at least a first base station of a wireless communication network; obtaining a service mapping that indicates which available frequencies correspond to which available services of the wireless communication network, where the UE has a service relationship with one or more services of the available services; and measuring signal quality or signal strength of one or more frequencies of the available frequencies based on the service mapping, the one or more frequencies including those that correspond to the one or more the services with which the UE has the service relationship.

Clause 2. The method of clause 1, where the one or more frequencies include a subset of the available frequencies, the method further including refraining from measuring signal quality or signal strength of one or more other frequencies that correspond to other services with which the UE does not have service relationship.

Clause 3. The method of any one of clauses 1-2, further including receiving a broadcast system information message from a first cell of the first base station, where the broadcast system information message includes the frequency information, the service mapping, or both.

Clause 4. The method of any one of clauses 1-3, further including: registering with the wireless communication network via a first cell of the first base station; sending a request to the first base station to obtain the frequency information; and receiving the frequency information in response to the request.

Clause 5. The method of clause 4, further including: establishing a radio resource control (RRC) relationship with the first cell; and measuring signal quality or signal strength of the one or more frequencies for cell reselection when the UE is in an RRC idle (RRC_IDLE) state or an RRC inactive (RRC_INACTIVE) state.

Clause 6. The method of any one of clauses 1-5, where obtaining the service mapping includes obtaining the service mapping from the first base station via at least one member selected from a group consisting of: a message that includes the service mapping; a broadcast system information message; a network slice selection assistance information (NSSAI) information element; and a measurement configuration message that includes the service mapping.

Clause 7. The method of any one of clauses 1-6, further including: determining one or more applications installed in the UE; and determining the one or more services with which the UE has the service relationship based, at least in part, on the one or more applications.

Clause 8. The method of any one of clauses 1-7, further including: determining the one or more services with which the UE has the service relationship based, at least in part, on traffic to or from one or more applications of the UE, wherein the traffic is associated with a domain name, Internet address, port, or protocol identification (ID) associated with the one or more services.

Clause 9. The method of any one of clauses 1-8, further including: determining the one or more services with which the UE has the service relationship based on at least one member selected from a group consisting of: a determination that one or more applications associated with the one or more services are active in a user interface of the UE; a determination that the UE has established a protocol data unit (PDU) session associated with the one or more services; a determination that at least one service of the one or more services is listed in an allowed network slice selection assistance information (NSSAI) information element indicating allowed services for the UE; and a determination that the one or more services is listed in a configured NSSAI information element indicating configured services for the UE.

Clause 10. The method of any one of clauses 1-9, further including, for each available service: determining whether the UE has a service relationship with the available service; and adding available frequencies that correspond the available service to a list of monitored frequencies when the UE has the service relationship with the available service; and periodically measuring signal strength or signal quality of cells associated with the list of monitored frequencies.

Clause 11. The method of clause 10, further including: adding frequencies that correspond to other services with which the UE does not have service relationship to a list of excluded frequencies; and refraining from measuring the signal strength or the signal quality of the list of excluded frequencies.

Clause 12. The method of any one of clauses 1-11, where measuring the signal quality or the signal strength of the one or more frequencies includes: measuring the signal strength or the signal quality when the UE has connection to a first cell of the first base station even when a corresponding signal strength or signal quality of the first cell is above a threshold signal strength or threshold signal quality.

Clause 13. The method of any one of clauses 1-12, further including: establishing a connection to a serving cell of the first base station to obtain the frequency information and the service mapping; measuring the signal quality or the signal strength of the one or more frequencies to select a target cell on a first frequency of the one or more frequencies that correspond to the one or more services with which the UE has the service relationship; and performing a cell reselection to establish the connection to the target cell.

Clause 14. The method of clause 13, further including: determining that the target cell is in a different tracking area than the serving cell; and performing a tracking area update registration as part of the cell reselection.

Clause 15. The method of any one of clauses 13-14, further including: selecting candidate cells from among one or more cells based on a service prioritization of the one or more services with which the UE has the service relationship, where the target cell is one of the candidate cells that support a first service that has a highest priority in the service prioritization.

Clause 16. The method of any one of clauses 13-15, further including: selecting the target cell from among the candidate cells based on a frequency prioritization of the one or more frequencies that correspond to the first service, where the target cell is on a first frequency has a highest priority in the frequency prioritization.

Clause 17. The method of any one of clauses 1-16, where the one or more services with which the UE has the service relationship are selected from a group consisting of: a mobile broadband data service, a voice service, an ultra-reliable low latency communication (URLLC) service, an internet of things (IOT) service, and a massive machine type communication (MMTC) service.

Clause 18. A user equipment (UE), including: at least one modem configured to: obtain frequency information indicating available frequencies of one or more cells of at least a first base station of a wireless communication network, and obtain a service mapping that indicates which available frequencies correspond to which available services of the wireless communication network, where the UE has a service relationship with one or more services of the available services; and a processing system configured to measure signal quality or signal strength of one or more frequencies of the available frequencies based on the service mapping, the one or more frequencies including those that correspond to the one or more the services with which the UE has the service relationship.

Clause 19. The UE of clause 18, where the one or more frequencies include a subset of the available frequencies, and where the processing system is configured to refrain from measuring signal quality or signal strength of one or more other frequencies that correspond to other services with which the UE does not have service relationship.

Clause 20. The UE of any one of clauses 18-19, where the at least one modem is configured to obtain a broadcast system information message from a first cell of the first base station, where the broadcast system information message includes the frequency information, the service mapping, or both.

Clause 21. The UE of any one of clauses 18-20, where the processing system is configured to register with the wireless communication network via a first cell of the first base station; and where the at least one modem is configured to: output a request to the first base station to obtain the frequency information, and obtain the frequency information in response to the request.

Clause 22. The UE of any one of clauses 18-21, where the at least one modem is configured to obtain the service mapping from the first base station via at least one member selected from a group consisting of: a message that includes the service mapping; a broadcast system information message; a network slice selection assistance information (NSSAI) information element; and a measurement configuration message that includes the service mapping.

Clause 23. The UE of any one of clauses 18-22, where the processing system is configured to: determine one or more applications installed in the UE; and determine the one or more services with which the UE has the service relationship based, at least in part, on the one or more applications.

Clause 24. The UE of any one of clauses 18-23, where the processing system is configured to: determine the one or more services with which the UE has the service relationship based, at least in part, on one or more applications that are active in a user interface of the UE.

Clause 25. The UE of any one of clauses 18-24, where the processing system is configured to determine the one or more services with which the UE has the service relationship based on at least one member selected from a group consisting of: a determination that the UE has established a protocol data unit (PDU) session for at least one service of the one or more services; a determination that at least one service of the one or more services is listed in an allowed network slice selection assistance information (NSSAI) information element indicating allowed services for the UE; and a determination that at least one service of the one or more services is listed in a configured NSSAI information element indicating configured services for the UE.

Clause 26. The UE of any one of clauses 18-25, where the processing system is configured to, for each available service: determine whether the UE has a service relationship with the available service; add available frequencies that correspond the available service to a list of monitored frequencies when the UE has the service relationship with the available service; and periodically measure signal strength or signal quality of cells associated with the list of monitored frequencies via the at least one modem.

Clause 27. The UE of any one of clauses 18-26, where the processing system is configured to: establish a connection to a serving cell of the first base station to obtain the frequency information and the service mapping; measuring the signal quality or the signal strength of the one or more frequencies to select a target cell on a first frequency of the one or more frequencies that correspond to the one or more services with which the UE has the service relationship; and perform a cell reselection to establish the connection to the target cell.

Clause 28. The UE of clause 27, where the processing system is configured to: select candidate cells from among one or more cells based on a service prioritization of the one or more services with which the UE has the service relationship, where the target cell is one of the candidate cells that support a first service that has a highest priority in the service prioritization.

Clause 29. The UE of clause 28, where the processing system is configured to: select the target cell from among the candidate cells based on a frequency prioritization of the one or more frequencies that correspond to the first service, where the target cell is on a first frequency has a highest priority in the frequency prioritization.

Clause 30. The UE of any one of clauses 18-29, further including: at least one transceiver coupled to the at least one modem; at least one antenna coupled to the at least one transceiver to wirelessly transmit signals output from the at least one transceiver and to wirelessly receive signals for input into the at least one transceiver; and a housing that encompasses at least the processing system, the at least one modem, the at least one transceiver, and at least a portion of the at least one antenna.

Another innovative aspect of the subject matter described in this disclosure can be implemented as a wireless communication device of a UE. The wireless communication device may include at least one interface and a processing system communicatively coupled with the at least one interface. The processing system may be configured to implement any one of the above clauses.

Another innovative aspect of the subject matter described in this disclosure can be implemented as a portable electronic device comprising a wireless communication device, a plurality of antennas coupled to the at least one transceiver to wirelessly transmit signals output from the at least one transceiver and a housing that encompasses the wireless communication device, the at least one transceiver and at least a portion of the plurality of antennas. The wireless communication device may include at least one interface and a processing system communicatively coupled with the at least one interface. The processing system may be configured to implement any one of the above clauses.

Another innovative aspect of the subject matter described in this disclosure can be implemented as a machine-readable medium having processor-readable instructions stored therein that, when executed by a processing system of a UE, cause the UE to implement any one of the above clauses.

Another innovative aspect of the subject matter described in this disclosure can be implemented as an apparatus. The apparatus may include means for implementing any one of the above clauses.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

As used herein, the terms "user equipment", "wireless communication device", "mobile communication device", "communication device", or "mobile device" refer to any one or all of cellular telephones, smartphones, portable computing devices, personal or mobile multi-media players, laptop computers, tablet computers, smartbooks, Internet-of-Things (IOT) devices, palm-top computers, wireless electronic mail receivers, multimedia Internet enabled cellular telephones, wireless gaming controllers, display sub-systems, driver assistance systems, vehicle controllers, vehicle system controllers, vehicle communication system, infotainment systems, vehicle telematics systems or subsystems, vehicle display systems or subsystems, vehicle data controllers or routers, and similar electronic devices which include a programmable processor and memory and circuitry configured to perform operations as described herein.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, or other information used to identify or authenticate a mobile communication device on a network and enable a communication service with the network. Because the information stored in a SIM enables the mobile communication device to establish a communication link for a particular communication service with a particular network, the term "subscription" is used herein as a shorthand reference to refer to the communication service associated with and enabled by the information stored in a particular SIM as the SIM and the communication network, as well as the services and subscriptions supported by that network, correlate to one another. A SIM used in various examples may contain user account information, an international mobile subscriber identity (IMSI), a set of SIM application toolkit (SAT) commands, and storage space for phone book contacts. A SIM card may further store home identifiers (such as, a System Identification Number (SID)/Network Identification Number (NID) pair, a Home Public Land Mobile Number (HPLMN) code, among other examples) to indicate the SIM card network operator provider. An Integrated Circuit Card Identity (ICCID) SIM serial number may be printed on the SIM card for identification. However, a SIM may be implemented within a portion of memory of the mobile communication device, and thus need not be a separate or removable circuit, chip or card.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication at a network entity, comprising:
transmitting frequency information indicating available frequencies of one or more cells of at least the network entity, wherein the frequency information is associated with network slicing at least at the network entity and a cell reselection procedure at a user equipment (UE);
transmitting a service mapping that indicates a correspondence between the available frequencies and available services of a wireless communication network, the available services comprising one or more services that correspond to network slices that are configured for use by the UE; and
establishing a connection with the UE based at least in part on the cell reselection procedure and the service mapping.

2. The method of claim 1, further comprising:
transmitting a message including an indication of the network slices that are configured for use by the UE.

3. The method of claim 1, further comprising:
transmitting a broadcast system information message that includes the frequency information, the service mapping, or both.

4. The method of claim 1, further comprising:
transmitting a dedicated message that includes the frequency information, the service mapping, or both.

5. The method of claim 4, further comprising:
receiving a request from the UE to obtain the frequency information, wherein the frequency information is transmitted via the dedicated message based at least in part on the request from the UE.

6. The method of claim 1, further comprising:
establishing, between a first cell and the UE, a protocol data unit session associated with the one or more services that are relevant to the UE.

7. The method of claim 1, wherein establishing the connection further comprises:
establishing, via a first cell, a radio resource control relationship with the UE.

8. The method of claim 1, wherein transmitting the service mapping further comprises:
transmitting a network slice selection assistance information (NSSAI) element comprising the service mapping.

9. The method of claim 1, wherein transmitting the service mapping further comprises:
transmitting a measurement configuration comprising the service mapping.

10. The method of claim 1, wherein:
the one or more services are listed in an allowed network slice selection assistance information (NSSAI) element that indicates one or more allowed services for the UE, the one or more allowed services for the UE include the one or more services that correspond to the network slices that are configured for use by the UE.

11. The method of claim 1, wherein each frequency of the available frequencies is associated with a respective priority.

12. The method of claim 1, wherein each service of the available services is associated with a respective priority.

13. The method of claim 1, wherein the one or more services of the available services comprise at least one of a mobile broadband data service, a voice service, an ultra-reliable low latency communication service, an internet of things service, or a massive machine type communication service.

14. The method of claim 1, wherein the one or more cells are associated with one or more network entities in addition to the network entity.

15. A network entity, comprising:
at least one modem configured to:
output frequency information indicating available frequencies of one or more cells of at least the network entity, wherein the frequency information is associated with network slicing at least at the network entity and a cell reselection procedure at a user equipment (UE); and
output a service mapping that indicates a correspondence between the available frequencies and available services of a wireless communication network, the available services comprising one or more services that correspond to network slices that are configured for use by the UE; and
a processing system configured to:
establish a connection with the UE based at least in part on the cell reselection procedure and the service mapping.

16. The network entity of claim 15, wherein the at least one modem is configured to:
output a message including an indication of the network slices that are configured for use by the UE.

17. The network entity of claim 15, wherein the at least one modem is configured to:
output a broadcast system information message that includes the frequency information, the service mapping, or both.

18. The network entity of claim 15, wherein the at least one modem is configured to:
output a dedicated message that includes the frequency information, the service mapping, or both.

19. The network entity of claim 18, wherein the at least one modem is configured to:
receive a request from the UE to obtain the frequency information, wherein the frequency information is output via the dedicated message based at least in part on the request from the UE.

20. The network entity of claim 15, wherein, to output the service mapping, the at least one modem is configured to:
output a measurement configuration comprising the service mapping.

21. The network entity of claim 15 wherein:
the one or more services are listed in an allowed network slice selection assistance information (NSSAI) element that indicates one or more allowed services for the UE, the one or more allowed services for the UE include the one or more services that correspond to the network slices that are configured for use by the UE.

22. The network entity of claim 15, wherein each service of the available services is associated with a respective priority.

23. The network entity of claim 15, wherein the one or more cells are associated with one or more base stations in addition to the network entity.

24. The network entity of claim 15, wherein the at least one modem is configured to:
    establish, between a first cell and the UE, a protocol data unit session associated with the one or more services that are relevant to the UE.

25. The network entity of claim 15, wherein the at least one modem is configured to:
    establish, via a first cell, a radio resource control relationship with the UE.

26. The network entity of claim 15, wherein, to output the service mapping, the at least one modem is configured to:
    output a network slice selection assistance information (NSSAI) element comprising the service mapping.

27. The network entity of claim 15, wherein each frequency of the available frequencies is associated with a respective priority.

28. The network entity of claim 15, wherein the one or more services of the available services comprise at least one of a mobile broadband data service, a voice service, an ultra-reliable low latency communication service, an internet of things service, or a massive machine type communication service.

29. A network entity, comprising:
    means for outputting frequency information indicating available frequencies of one or more cells of at least the network entity, wherein the frequency information is associated with network slicing at least at the network entity and a cell reselection procedure at a user equipment (UE);
    means for outputting a service mapping that indicates a correspondence between the available frequencies and available services of a wireless communication network, the available services comprising one or more services that correspond to network slices that are configured for use by the UE; and
    means for establishing a connection with the UE based at least in part on the cell reselection procedure and the service mapping.

30. A non-transitory computer-readable medium storing code, the code comprising instructions executable by one or more processors to:
    output frequency information indicating available frequencies of one or more cells of at least a network entity, wherein the frequency information is associated with network slicing at least at the network entity and a cell reselection procedure at a user equipment (UE);
    output a service mapping that indicates a correspondence between the available frequencies and available services of a wireless communication network, the available services comprising one or more services that correspond to network slices that are configured for use by the UE; and
    establish a connection with the UE based at least in part on the cell reselection procedure and the service mapping.

* * * * *